United States Patent
Murase et al.

(10) Patent No.: US 7,206,436 B2
(45) Date of Patent: Apr. 17, 2007

(54) COMPUTER READABLE MEDIUM RECORDING HANDWRITTEN SIGNATURE AUTHENTICATION PROGRAM, AND HANDWRITTEN SIGNATURE AUTHENTICATION METHOD APPARATUS

(75) Inventors: Tadashi Murase, Nagoya (JP); Takashi Maeda, Nagoya (JP); Shinya Matsunaga, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 698 days.

(21) Appl. No.: 10/179,992

(22) Filed: Jun. 26, 2002

(65) Prior Publication Data

US 2003/0179912 A1    Sep. 25, 2003

(30) Foreign Application Priority Data

Mar. 19, 2002    (JP)    ............................ 2002-075334

(51) Int. Cl.
*G06K 9/00* (2006.01)
*H04N 7/18* (2006.01)

(52) U.S. Cl. .................. 382/119; 73/865.4; 178/18.01; 348/161

(58) Field of Classification Search ........ 382/119–123; 73/865.4; 178/18.01–20.04; 348/161
See application file for complete search history.

(56) References Cited

U.S. PATENT DOCUMENTS 4,028,674 A * 6/1977 Chuang ...................... 382/123
5,559,895 A * 9/1996 Lee et al. .................... 382/119
5,680,470 A * 10/1997 Moussa et al. ............. 382/119
6,424,728 B1 * 7/2002 Ammar ....................... 382/119

FOREIGN PATENT DOCUMENTS

| CN | 1272932 | 11/2000 |
|----|---------|---------|
| CN | 1285939 | 2/2001 |
| EP | 1 020 817 | 7/2000 |
| EP | 1 028 391 | 8/2000 |
| JP | 11-110544 | 4/1999 |
| JP | 11-144056 | 5/1999 |

\* cited by examiner

*Primary Examiner*—Bhavesh M. Mehta
*Assistant Examiner*—Aaron Carter
(74) *Attorney, Agent, or Firm*—Staas & Halsey LLP

(57) ABSTRACT

When a signature is registered, a signature in Japanese characters, for example, '富 ± 通' ('Fujitsu'), or a signature in English characters, for example, 'Fujitsu' is input n times through an input device of an input equipment of a signature authentication system, and each element of the shape of handwriting, writing speed, writing acceleration, and writing pressure is computed. A combination of nC2 is set for each element of the data input n times, the reciprocal of each similarity is obtained, an average value of the similarity is computed for each element, a weight is determined for each similarity from the average value, a weighted average value of the four elements is computed and defined as the total similarity of the registered signature. In an authenticating process, signature data to be compared is input/output m times. In the same method, the total similarity of a signature to be compared is obtained.

7 Claims, 16 Drawing Sheets

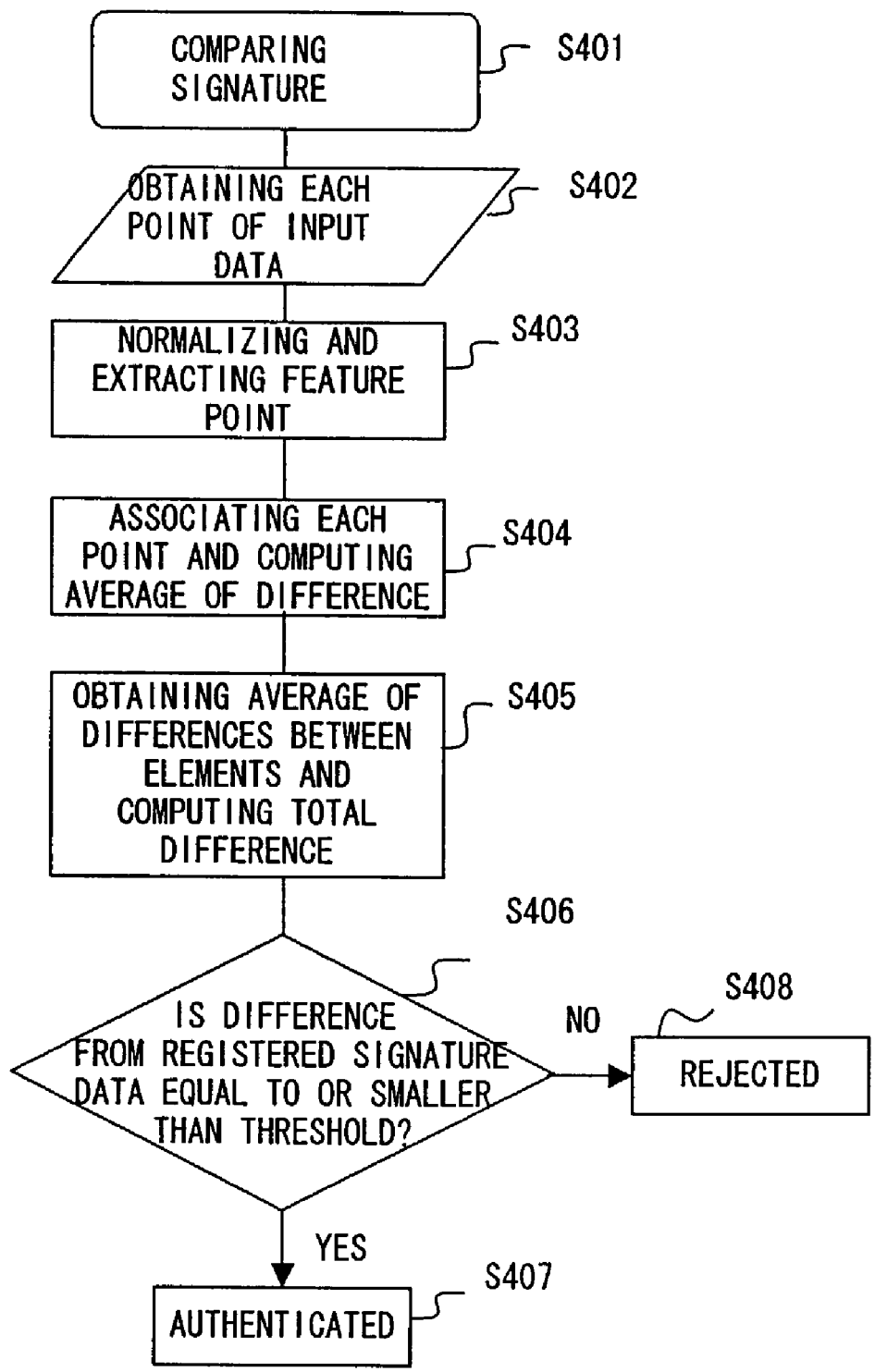
F I G. 5

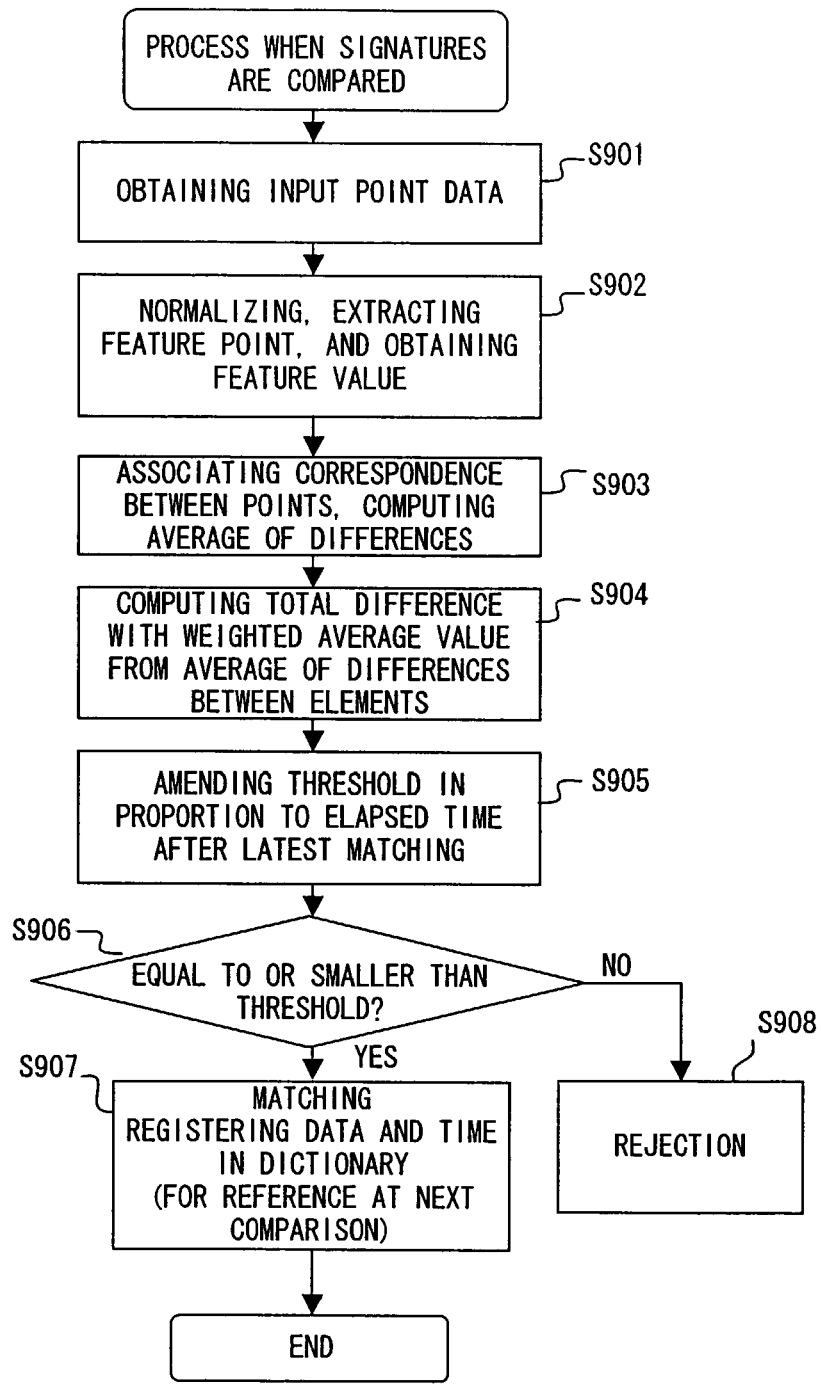
F I G. 9

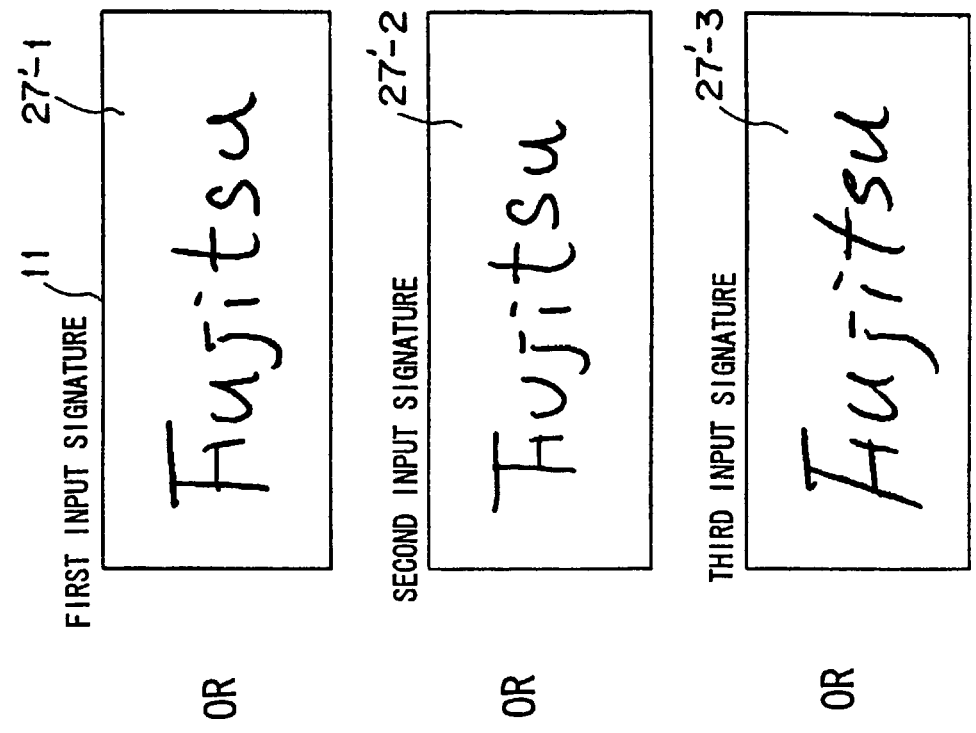
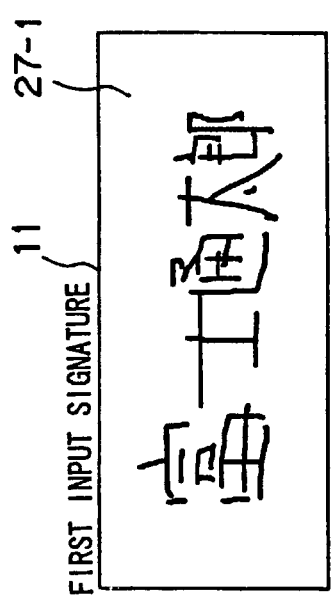
FIG. 12A
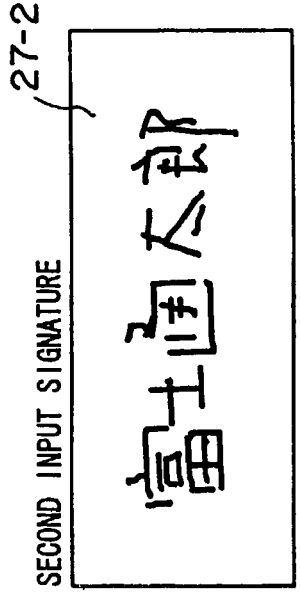
FIG. 12B
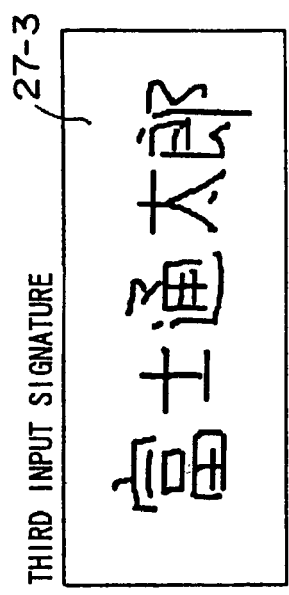
FIG. 12C

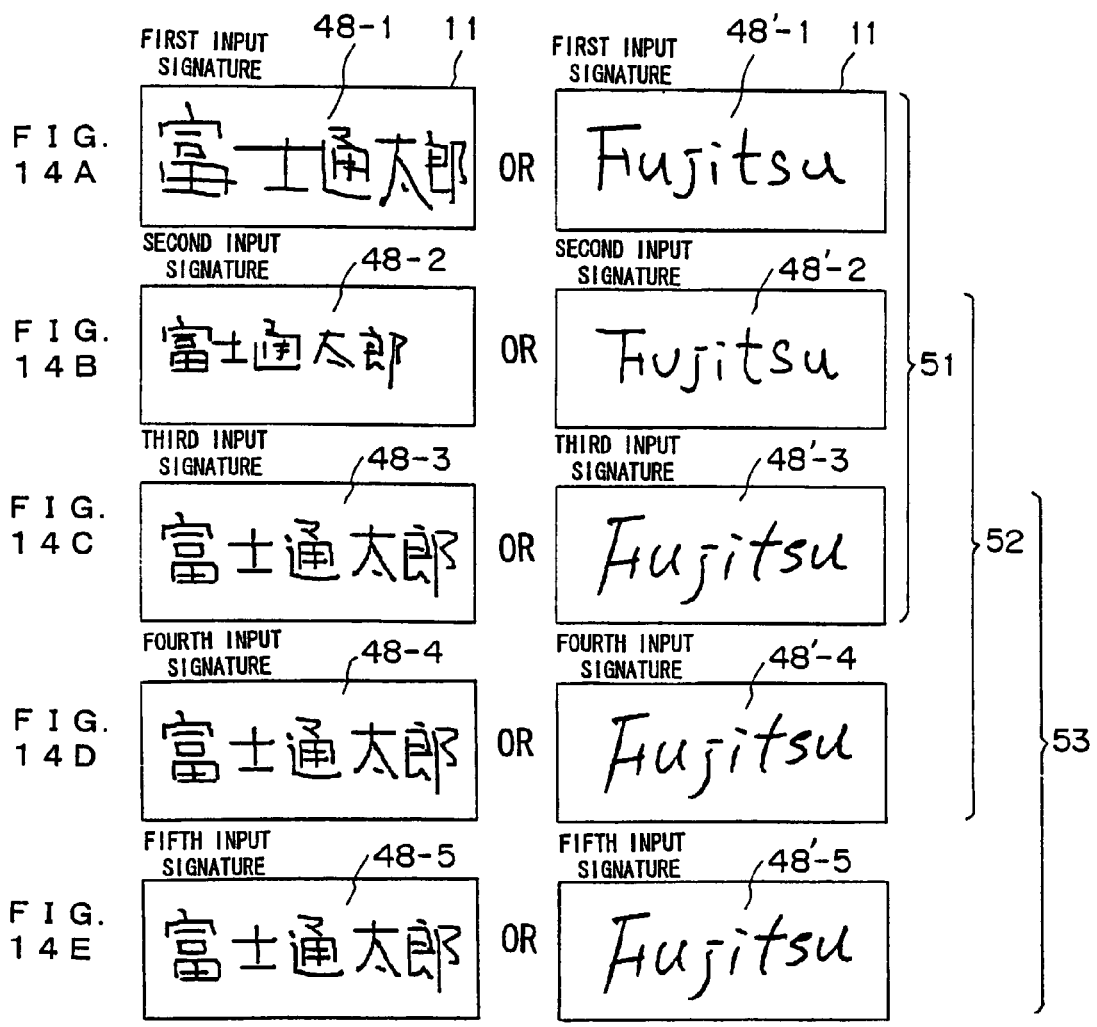

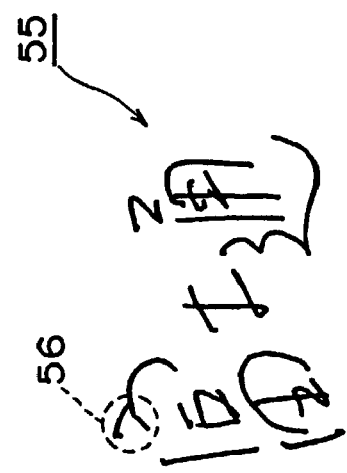
FIG. 15A
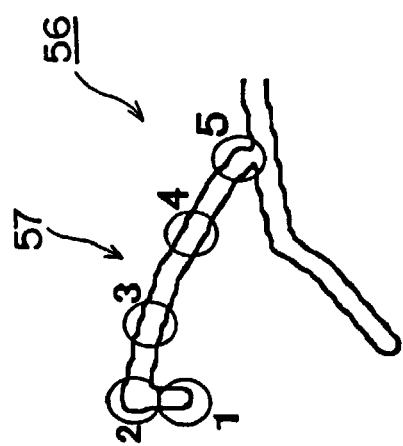
FIG. 15B
OR
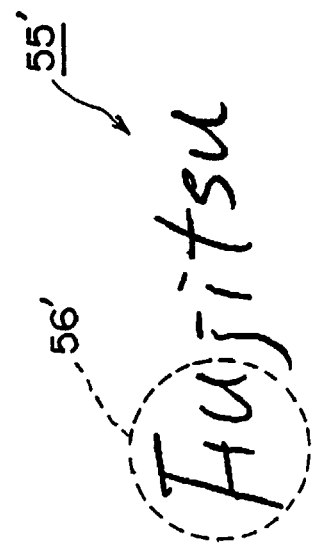
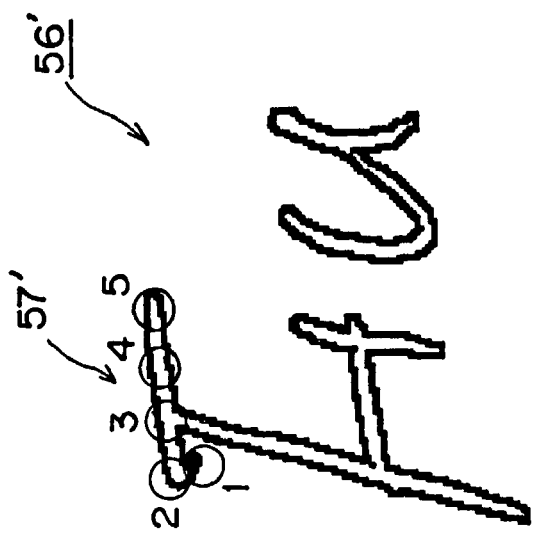

COMPUTER READABLE MEDIUM RECORDING HANDWRITTEN SIGNATURE AUTHENTICATION PROGRAM, AND HANDWRITTEN SIGNATURE AUTHENTICATION METHOD APPARATUS

BACKGROUND OF THE INVENTION

1. Field of the Invention

The present invention relates to a hand-written signature authentication program, method, and apparatus capable of improving the matching precision by preprocessing or postprocessing matching data of hand-written signature.

2. Description of the Related Art

Conventionally, an authenticating method based on the amount of the feature of a hand-written signature is well known as one of the biometrics authenticating methods (of authenticating a user based on the physical features of a person such as a fingerprint, a retina, an iris, a voice print, etc. when the person is accessing a network or activating a personal computer). In this case, a matching check is carried out by comparing the amount of the feature in the shape of handwriting, writing speed, writing acceleration, writing pressure, etc. between a hand-written signature placed when it is registered and a hand-written signature placed when the user is to be authenticated.

FIG. 1 shows the conventional authentication system based on hand-written signatures. In FIG. 1, an authentication system 1 first inputs '富士通太郎' ('Fujitsu Taro') which is a signature 4 in Japanese characters, or 'Fujitsu' which is a signature 4' in English characters with an exclusive pen not shown in the attached drawings into a handwriting input device 3 connected to a data input display device 2.

Then, the information obtained from the signature 4 or 4' is registered in, for example, a host equipment 5 of a large computer, etc. The information obtained from the signature 4 or 4' can be the shape of handwriting, writing speed, writing acceleration, writing pressure, etc.

When a person named 富士通太郎 (Fujitsu Taro) or Fujitsu is to be authenticated, the person inputs again 富士通太郎 (Fujitsu Taro), the hand-written signature 4 in Japanese characters, or Fujitsu, the hand-written signature 4' in English characters, into the handwriting input device 3 of the data input display device 2 as described above. The information about the shape of handwriting, writing speed, writing acceleration, and writing pressure of the signature 4 or 4' is given to the host equipment 5. Then, the host equipment 5 compares the shape of handwriting, writing speed, writing acceleration, and writing pressure of the registered hand-written signature with the shape of handwriting, writing speed, writing acceleration, and writing pressure of the just input hand-written signature, and notifies the data input display device 2 of the matching/non-matching result.

In this case, the amount of the feature of the above mentioned shape of handwriting, writing speed, writing acceleration, and writing pressure has been conventionally represented by numeric values by computing the similarity between the amount of the feature obtained at the time of registration and the amount of the feature obtained at the time of application for authentication. The matching/non-matching result is determined using the total values of the amounts of features according to the common comparison logic.

However, since a hand-written signature is biometrics information, the feature appearing in the amount of the feature depends on each person, that is, each person has his or her own amount of the feature. Therefore, in the conventional common comparison logic for evaluation based on the total value of similarity with the amount of the feature of respective writing components, the above mentioned different features depending on each person are ignored, thereby failing in obtaining the optimum comparison result for each person. As a result, a person to be authenticated can be mistakenly rejected, or a wrong person can be mistakenly authenticated.

SUMMARY OF THE INVENTION

The present invention has been developed to solve the above mentioned problems, and aims at providing a program, method, and apparatus for authenticating a handwritten signature with the matching precision enhanced by dynamically weighting the amount of the feature for each person, taking the secular change in the amount of the feature into account, automatically determining the training level of a registered signature, and removing the unstable portions in handwriting.

To attain the purpose, the hand-written signature authentication program according to the first embodiment of the present invention is configured to direct a computer to perform the processes of: inputting a hand-written signature several times; computing the amount of the feature by analyzing each predetermined feature of the data of the hand-written signature input several times; computing average similarity of the amounts of the features among the above mentioned hand-written signature input several times; setting a weight for each amount of the feature from the computed average similarity and assigning the weight to each amount of the feature, thereby dynamically assigning the weight; and registering in a predetermined storage device each amount of the feature together with the assigned weight as hand-written signature data for registration of the person who placed the hand-written signature several times as described above.

Then, the hand-written signature authentication program according to the second embodiment is configured to direct a computer to perform: a signature inputting process of inputting a hand-written signature; a feature amount computing process of computing each amount of the feature by analyzing a predetermined feature of the data of the hand-written signature input in the signature inputting process; a similarity computing process of computing an average of the similarity between the amount of the feature of the hand-written signature, which is registered in advance in a predetermined storage device, of the person who input the hand-written signature input several times and the amount of the feature computed in the feature amount computing process; an input signature weighted average computing process of computing a weighted average value of the similarity, which is computed in the similarity computing process, using the weight recorded together with the registered amount of the feature of the hand-written signature input several times as described above; a registered signature weighted average computing process of obtaining each average similarity for each similarity among the amounts of the features of the hand-written signatures, which are registered in advance in a predetermined storage device, of the person who input the hand-written signature several times, and computing a weighted average value of each average similarity using the weight; a weighted average value difference computing process of computing a difference between a weighted average value computed in the input signature weighted average computing process and a weighted average value computed in the registered signature weighted average computing process; and an authentication/rejection determining process of outputting an authentication result when the difference computed in the weighted average value difference computing process is equal to or smaller than a predetermined threshold, and outputting a rejection result when the difference exceeds the predetermined threshold.

The above mentioned similarity is configured as a reciprocal of the difference between the corresponding amounts of the features. In addition, the amount of the feature of the component is configured as the amount of the feature of the signature information about at least one of, for example, the shape of handwriting, writing speed, writing acceleration, and writing pressure.

The hand-written signature authentication program according to the third embodiment of the present invention is configured to direct a computer to perform the processes of: recording a predetermined amount of the feature of the data of an input hand-written signature as the registered data of the hand-written signature in a predetermined storage device; comparing a predetermined value computed from the amount of the feature with a predetermined value computed from a predetermined amount of the feature of the data of the hand-written signature input for matching for authentication; and determining whether or not an authentication result is to be output depending on whether the difference is equal to or smaller than a predetermined threshold or exceeds the threshold. The program is configured to allow the computer to perform the process of setting a threshold for the difference which changes depending on the secular change in the amount of the feature of a hand-written signature such that the allowance can be moderated with the lapse of time.

The hand-written signature authentication program according to the fourth embodiment of the present invention is configured to direct a computer to perform the processes of: recording a predetermined amount of the feature of the data of an input hand-written signature as the registered data of the hand-written signature in a predetermined storage device; comparing a predetermined value computed from the amount of the feature with a predetermined value computed from a predetermined amount of the feature of the data of the hand-written signature input for matching for authentication; and determining whether or not an authentication result is to be output depending on whether the difference is equal to or smaller than a predetermined threshold or exceeds the threshold. The program is configured to allow the computer to perform: a first registering process of inputting the n (n≧2) latest hand-written signatures, computing differences among the amounts of the features of the data of the input hand-written signatures, and defining the last hand-written signature or a newly input hand-written signature as the registered data when the difference is equal to or smaller than the predetermined threshold; and a second registering process of repeating the processes of inputting the hand-written signature once again, and computing the difference among the amounts of the features of the data of the n latest hand-written signatures including the newly input hand-written signature when the difference exceeds the threshold, defining the last or the newly input hand-written signature in the n latest hand-written signatures as the registered data when the difference is equal or smaller than the threshold, and, when the difference exceeds the threshold, inputting again the hand-written signature, computing the differences among the amounts of the features of the data of the n latest input hand-written signatures, and comparing the differences with the threshold to determine whether or not the data is to be registered.

The hand-written signature authentication program according to the fifth embodiment of the present invention is configured to direct a computer to perform the processes of: recording a predetermined amount of the feature of the data of an input hand-written signature as the registered data of the hand-written signature in a predetermined storage device; comparing a predetermined value computed from the amount of the feature with a predetermined value computed from a predetermined amount of the feature of the data of the hand-written signature input for matching for authentication; and determining whether or not an authentication result is to be output depending on whether the difference is equal to or smaller than a predetermined threshold or exceeds the threshold. The program is configured to allow the computer to perform the processes of: registering the hand-written signature data for registration input as the registered data excluding the irregular portions in handwriting; and comparing the data of the hand-written signature data for matching with the data of the hand-written signature data for registration excluding the irregular portions in the hand-written signature data for matching input for the matching for authentication. The irregular portions are, for example, the unstable handwriting at the time of starting the input.

The hand-written signature authenticating method according to the sixth embodiment of the present invention is configured to have a hand-written signature data generating and registering step for matching for authentication including: a signature inputting step of inputting a hand-written signature several times; a feature amount computing step of computing the amount of the feature by analyzing each predetermined feature of the data of the hand-written signature input several times in the signature inputting step; a similarity computing step of computing average similarity of the amounts of the features, computed in the feature amount computing step, among the above mentioned hand-written signature input several times; a weight assigning step of setting a weight for each amount of the feature from the average similarity computed in the similarity computing step and assigning the weight to each amount of the feature, thereby dynamically assigning the weight; and a signature data registering step of registering in a predetermined storage device each amount of the feature together with the weight assigned in the weight assigning step as hand-written signature data for registration of the person who placed the hand-written signature several times as described above.

The hand-written signature authenticating method according to the seventh embodiment of the present invention is configured to have a hand-written signature authenticating step including: a signature inputting step of inputting a hand-written signature; a feature amount computing step of computing each amount of the feature by analyzing a predetermined feature of the data of the hand-written signature input in the signature inputting step; a similarity computing step of computing an average of the similarity between the amount of the feature of the hand-written signature, which is registered in advance in a predetermined storage device, of the person who input the hand-written signature input several times and the amount of the feature computed in the feature amount computing step; an input signature weighted average computing step of computing a weighted average value of the similarity, which is computed in the similarity computing step, using the weight recorded together with the registered amount of the feature of the hand-written signature input several times as described above; a registered signature weighted average computing step of obtaining each average similarity for each similarity among the amounts of the features of the hand-written signatures, which are registered in advance in a predetermined storage device, of the person who input the hand-written signature several times, and computing a weighted average value of each average similarity using the weight; a weighted average value difference computing step of computing a difference between a weighted average value computed in the input signature weighted average computing step and a weighted average value computed in the registered signature weighted average computing step; and an authentication/rejection determining step of outputting an authentication result when the difference computed in the weighted average value difference computing step is equal to or smaller than a predetermined threshold, and outputting a rejection result when the difference exceeds the predetermined threshold.

The apparatus also performs the above mentioned processes using the programs according to the first through fifth embodiments of the present invention, and performs the above mentioned processes in the methods according to the sixth and seventh embodiments of the present invention.

Thus, since the amount of the feature indicating the most outstanding characteristic of a person is evaluated when the signature information is compared according to the present invention, the registration and the authentication can be performed using the data clearly representing the feature of a person, thereby protecting a person to be authenticated against being mistakenly rejected, or preventing a wrong person from being mistakenly authenticated. As a result, the authentication precision can be improved, and, for example, a computer system can be provided with a reliable security system including an effective hand-written signature authentication system.

Furthermore, since the allowance of a threshold can be moderated in a later matching process with the lapse of time from the previous successful matching result, a person can be authenticated independent of the learning level although the frequency of data input for authentication is low, thereby successfully authenticating a person regardless of the input frequency for authentication. As a result, the operability of the hand-written signature authentication system can be improved.

In addition, since input signature information is used as signature information for registration according to the present invention, the signature information for registration has a stable value, thereby obtaining a reliable hand-written signature authentication system for use in a matching process for authentication.

Furthermore, since the registration and the authentication can be performed using the data of original feature points excluding the signature information about irregular portions in handwriting such as the starting and end portions of a hand-written signature through an input device, misidentification by the input device in an authenticating process can be avoided, thereby improving the operability of the hand-written signature authentication system.

BRIEF DESCRIPTION OF THE DRAWINGS

FIG. 5 is a flowchart of the process performed when a signature is compared for authentication in the signature authentication system according to the first embodiment of the present invention;

FIG. 9 is a flowchart of the process of comparing signature data according to the second embodiment of the present invention;

FIGS. 12A through 12C shows an example of a signature hand-written and input into an input device in the process performed in the hand-written signature authenticating method according to the third embodiment of the present invention;

FIGS. 14A through 14E shows an example of a signature sequentially hand-written and input into an input device in the process performed in the hand-written signature authenticating method in a variation of the third embodiment of the present invention;

FIG. 15A shows an example of the handwriting of '富 土 通' ('Fujitsu') in the Japanese characters or 'Fujitsu' in the English characters input into the input device for explanation of the irregular portions in handwriting specific to the input device;

FIG. 15B is an enlarged view of the portion encompassed by a circle 56 or a circle 56' of the above mentioned signature in the Japanese characters or the signature in the English characters.

DESCRIPTION OF THE PREFERRED EMBODIMENTS

The embodiments of the present invention are described below by referring to the attached drawings.

Figure 1:
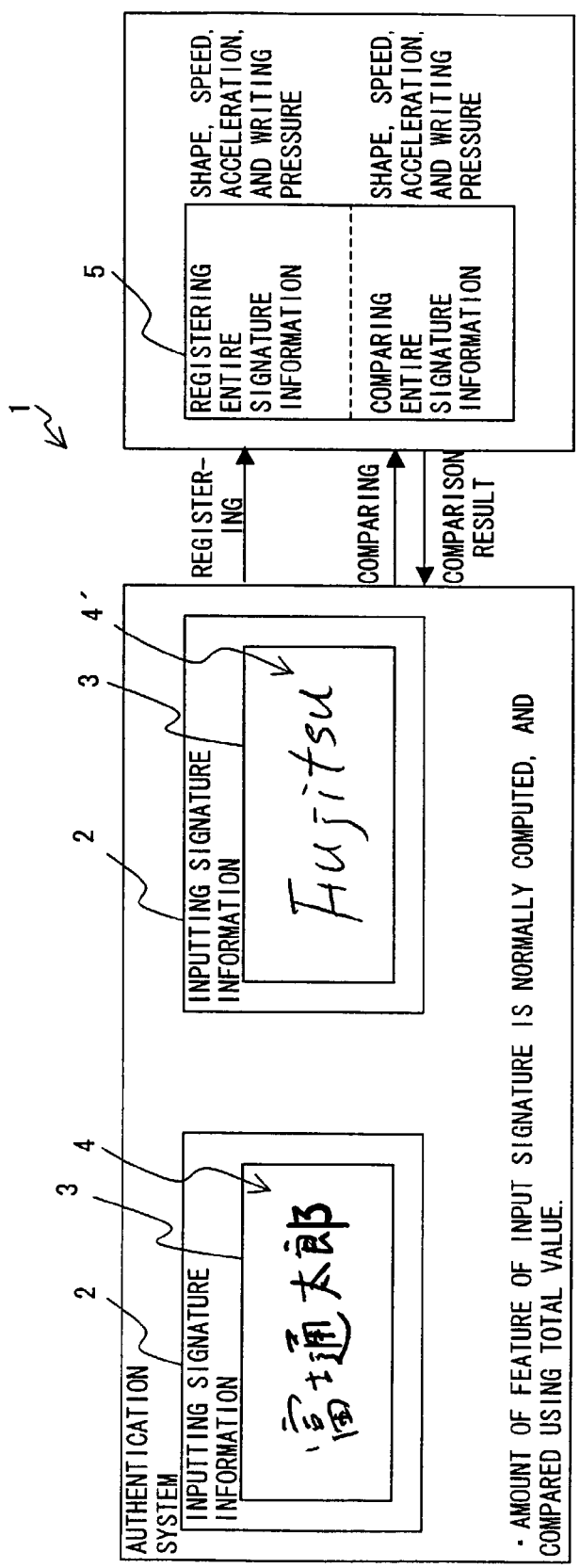
FIG. 1 shows the conventional authentication system using a hand-written signature.
Figure 2:
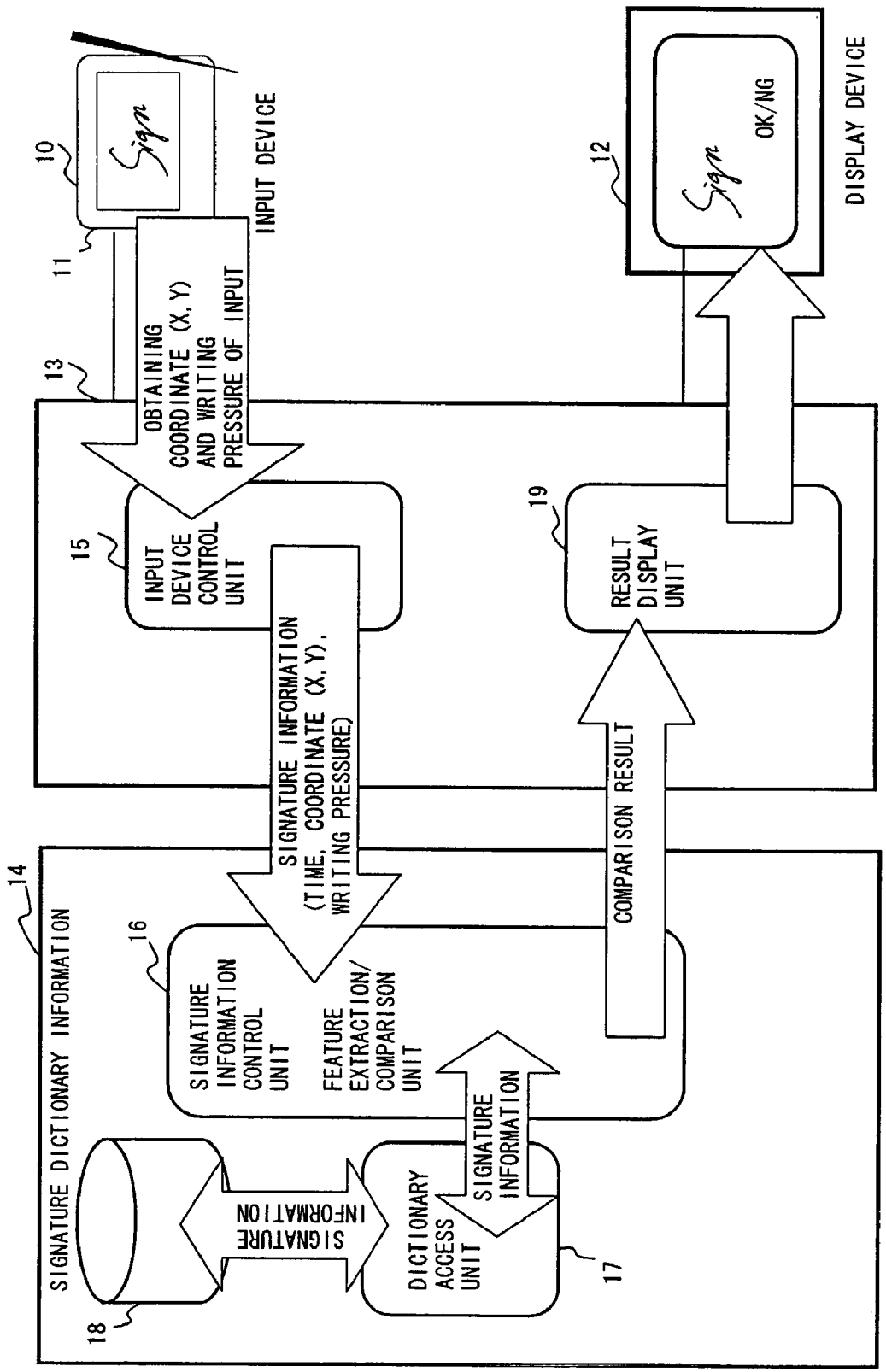
FIG. 2 is a typical view of the basic configuration of the hardware used in each embodiment of the present invention in the hand-written signature authenticating method according to the present invention.

FIG. 2 is a typical view of the basic configuration of the hardware used in each embodiment of the present invention in the hand-written signature authenticating method according to the present invention. As shown in FIG. 2, the hardware configuration used in the hand-written signature authenticating method according to the present invention comprises input equipment 13 to which an input device 11 provided with an input tool 10 and a display device 12 are connected, and host equipment 14 which is provided with, for example, a large computer system, etc. connected to the input equipment 13.

The host equipment 14 and the input equipment 13 can be directly connected through wiring, or through a network such as Internet, Intranet, etc. The input equipment 13 can be configured by, for example, a personal computer.

The input tool 10 and the input device 11 can be a tablet, etc. comprising a stylus (10) and a hand-written input plate (11). In this case, the display device 12 comprises, for example, a CRT (cathode ray tube) or an LCD (liquid crystal display), etc. connected to a personal computer.

The input tool 10 and the input device 11 can be a portable information terminal device, etc. for personal use referred to as a PDA (personal digital assistant). Normally, in this case, a transparent handwriting input device (10) is put on the display device 12, and a signature is input with a pen (11), etc. into the handwriting input device (10).

The input device 11 and the display device 12 are connected to the input equipment 13 not only directly through wiring, but also through infrared communications, Bluetooth communications, or any other short distance wireless communications methods.

In any case, the input information about a hand-written signature which is hand-written and input using the input tool 10 through the input device 11 is input into an input device control unit 15 of the input equipment 13. The input information about the hand-written signature input from the input device 11 to the input device control unit 15 includes coordinate data (x,y) of the point input with a stylus, etc. and writing pressure data. The input device control unit 15 adds the time data to the coordinate data (x,y) and the writing pressure data, and the resultant data is input into a signature information control unit 16 of the host equipment 14.

The signature information control unit 16 computes the writing speed and the writing acceleration of the hand-written signature for each point based on the coordinate data (x,y) and the time data. On the other hand, the signature information control unit 16 generates each piece of handwriting shape data with the point having the writing pressure data of zero (0) defined as the starting or end point of a stroke (acceptable handwriting indicates one stroke of a character).

Thus, the signature information control unit 16 the four types of data, that is, the shape of handwriting, writing speed, writing acceleration, and writing pressure, corresponding to the above mentioned hand-written signature are associated with one another. The signature information control unit 16 extracts the amount of the feature based on a predetermined reference from the data.

The signature information control unit 16 registers the amount of the feature of the hand-written signature as hand-written signature data for registration by storing it in a signature dictionary information 18 including a predetermined storage device through a dictionary access unit 17 if the above mentioned hand-written signature is placed when it is registered.

When a signature is input several times by the same person at the time of registration, the signature information control unit 16 extracts the amounts of the features of the signature data input several times, compares the signature data with one another, and notifies a result display unit 19 of the input equipment 13 of the comparison result. The result display unit 19 drives for display the display device 12, and displays data based on the above mentioned comparison result. For example, it displays "The registration has been completed.", "Input the signature again.", etc.

On the other hand, when the above mentioned hand-written signature is placed for authentication at the time of comparison, the signature information control unit 16 reads the hand-written signature data for registration registered in advance corresponding to the hand-written signature from the signature dictionary information 18 through the dictionary access unit 17, extracts the amount of the feature of the read hand-written signature data for registration, compares the data with the hand-written signature data for matching which has been input from the input device control unit 15 and whose amount of the feature has just been extracted, and notifies the result display unit 19 of the input equipment 13 of a matching/non-matching result.

In this case, the result display unit 19 also drives for display the display device 12, and displays data based on the above mentioned comparison result. In this case, if the comparison result is a matching result (authenticated), then, for example, "Successfully authenticated.", etc. is displayed. If the comparison result is a non-matching result (rejection result), then, for example, "You have been rejected," etc. is displayed.

FIGS. 3A through 3D show the basic configuration of the hand-written signature data (communications data) used in the communications among a client (for example, the input device 11 in case of, for example, the PDA, and the input device 11, the display device 12, and the input equipment 13 in case of the personal computer system), a relay layer (a communications path connecting the input equipment 13 to the host equipment 14), and an authentication engine unit (the signature information control unit 16 of the host equipment 14) in the hand-written signature authentication system with the configuration of the above mentioned hardware.

Figure 3:
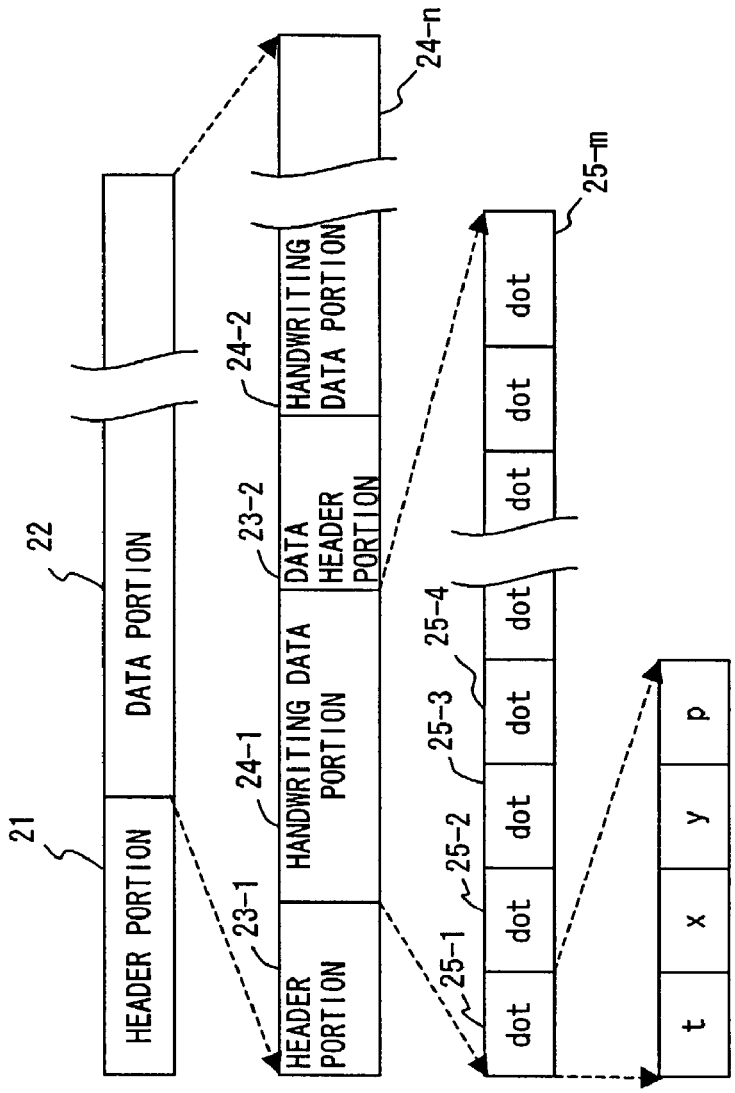
FIGS. 3A through 3D show the basic configuration of the hand-written signature used in the communications among a terminal unit, a relay path, and a host equipment in the hand-written signature authentication system according to the present invention.

FIG. 3A shows the entire configuration of the communications data comprising a header portion 21 and a data portion 22. FIG. 3B shows the configuration of the signature data forming the data portion 22 of the communications data. As shown in FIG. 3B, the signature data comprises data header portions 23 (23-1, 23-2, . . . , 23-n) and handwriting data portions 24 (24-1, 24-2, . . . , 24-n). The handwriting data portion 24 corresponds to a character string of one signature (family name and first name).

FIG. 3C shows the configuration of the handwriting data portion 24, and the handwriting data portion 24 comprises a plenty of point data 25 (25-1, 25-2, . . . , 25-m). FIG. 3D shows the configuration of each point data (dot) 25. As shown in FIG. 3D, each point data (dot) 25 is formed by the data indicated by 't', 'x', 'y', and 'p'.

The 't' indicates a time, and is formed by 2-byte data. The 'x' and 'y' indicate the absolute coordinates of the horizontal and vertical axes of the input plate of a tablet or the input device of the PDA, and respectively comprises 2-byte data. The 'p' indicates the writing pressure, and is formed by 2-byte data. That is, one piece of the point data 25 of the handwriting data portion 24 is configured by the data of 8 bytes in total.

The position of the point data 25 in which the value of the 'p' in the 8-byte data is '0×00' indicating the writing pressure of '0' is discriminated as the starting or end point of one stroke of handwriting.

In the hand-written signature authenticating method with the above mentioned basic configuration of the hardware, the first embodiment is described below.

Figure 4:
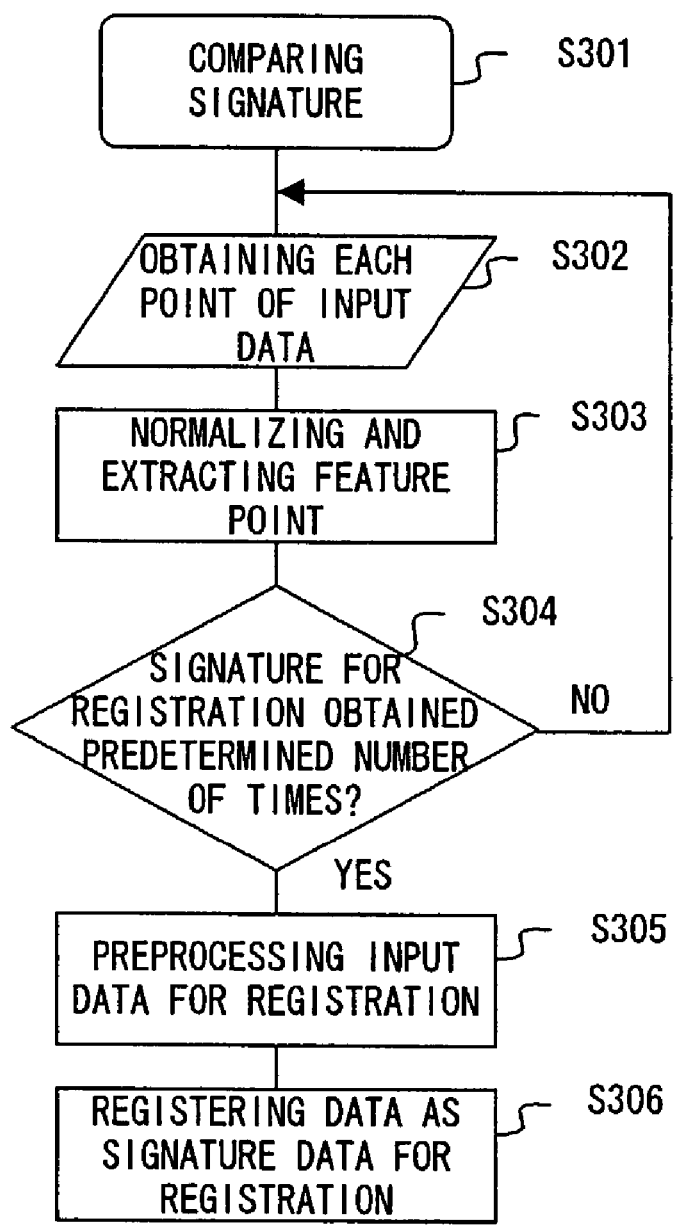
FIG. 4 is a flowchart of the process performed when a signature is registered in the hand-written signature authentication system according to the first embodiment of the present invention.

FIG. 4 is a flowchart of the process performed when a signature is registered in the hand-written signature (hereinafter referred to simply as a signature) authentication system according to the first embodiment of the present invention.

FIG. 5 is a flowchart of the process performed when a signature is compared for authentication in the authentication system according to the first embodiment of the present invention.

Figure 6:
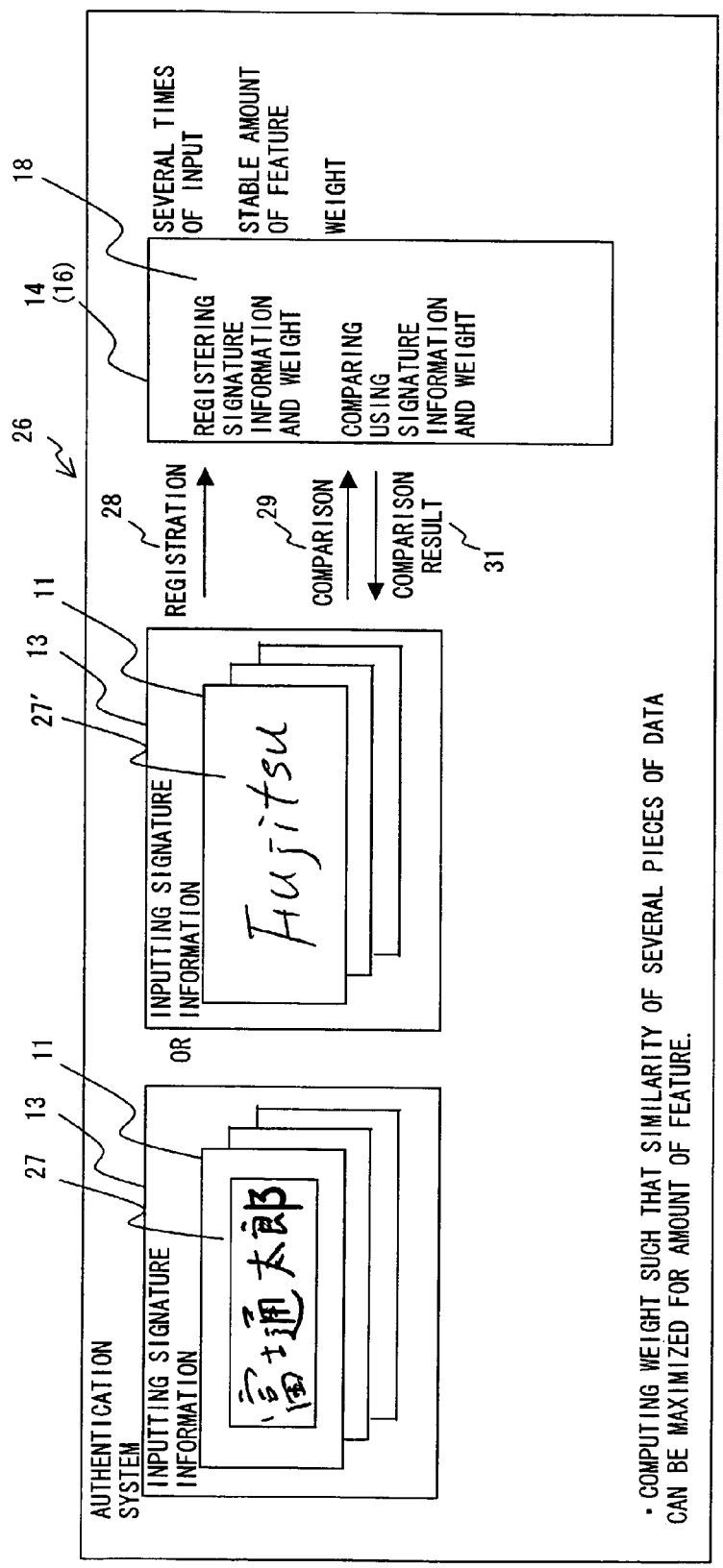
FIG. 6 is a typical view of the outline of the process performed when the registration and the authentication are performed among the modules of the signature authentication system according to the first embodiment of the present invention.

FIG. 6 is a typical view of the outline of the authenticating method among each module in the above mentioned process. The process performed when a signature is registered is described below first by referring to FIGS. 4 and 6, and then the process performed when signatures are compared is described below first by referring to FIGS. 5 and 6.

First, in FIG. 4, if the process performed when a signature is registered is started (S301), a person trying to register his or her signature inputs a signature 27 in Japanese characters, for example, '富士通太郎' ('Fujitsu Taro') or a signature 27' in English characters, for example, 'Fujitsu' using the input device 11 connected to the input equipment 13 in a signature authentication system 26 as shown in FIG. 6.

Based on the input, the input device 11 obtains the data of each input point as shown in FIG. 4 (S302). The data of each input point is the point data shown in FIG. 3C. The signature 27 in Japanese characters or the signature 27' in English characters obtained as the point data is input as shown in FIG. 6 as input signature data 28 for registration into the signature information control unit 16 of the host equipment 14 through a predetermined communications path shown in FIG. 2.

The signature information control unit 16 performs a normalizing process for adjusting the position of the origin for each piece of point data of the input signature 27 in Japanese characters or signature 27' in English characters, and extracts the feature point of each stroke (S303). The feature point is different from the above mentioned amount of the feature or the amount of the feature described later, but refers to a feature portion of a starting point, an end point, a curve point, etc. of handwriting.

Then, the signature information control unit 16 determines whether or not the above mentioned signature data has been obtained a predetermined number of times (S304). According to the present embodiment, to obtain a stable amount of the feature of the components (data of the shape of handwriting, writing speed, writing acceleration, and writing pressure) of each stroke of input signature data, a signature is input several times when it is registered. To attain the purpose, it is determined in this process whether or not the signature has been input a predetermined number of times. In the present embodiment, a signature is input five times when it he registered.

If the signature has not been input the predetermined number of times (NO in S304), then the next input of the signature is awaited in S302, and the processes in S302 through S304 are repeated.

If the signature has been input the predetermined number of times (YES in S304) according to the present embodiment, then a preprocess of input data for registration is performed according to the signatures input five times (S305). In the preprocess of the input data for registration, the amount of the feature is extracted for each component from the signatures input five times, and the weight obtained from the amount of the feature is associated with each piece of component data.

Then, the data comprising the preprocessed component data and the weight data is registered as signature data for registration in the signature dictionary information 18 (S306).

Described below is the above mentioned weight setting method. Normally, a person has his or her own feature (characteristic) in his or her handwriting. There can be four elements (components) of handwriting indicating such features as described above, that is, the shape of handwriting, writing speed, writing acceleration, writing pressure, etc. Every person can stably input one of the elements. Therefore, by comparing the amounts of the features of the elements, a signature for authentication can be compared more correctly in the method according to the present embodiment.

First, the difference in element is obtained between input signature data obtained by inputting a signature five timed as described above. Then, the ratio of the differences between the elements is obtained. As a result, a smaller difference of an element (stable element) can be obtained as the similarity of input data. Based on the similarity, a weight is determined. The similarity described above or to be described later refers to a reciprocal of a difference.

To practically obtain the weight, a combination '(Ss1, Sv1, Sa1, Sp1), (Ss2, Sv2, Sa2, Sp2), . . . , (Ss10, Sv10, Sa10, sp10)' of $_5C_2$ (10) of the similarity of 'Ss, Sv, Sa, Sp' is computed for each component of the shape of handwriting, writing speed, writing acceleration, and writing pressure of the signature data input five times. Then, the average '(Sse, Sve, Sae, Spe)' is obtained.

Before the computation, the similarity 'Ss, Sv, Sa, Sp' of each of the above mentioned component can be computed as follows. First, each element is defined as a set of n points. The element of the former input is represented by '*dn', and the element of the latter input is represented by '*in'.

First, the difference in the handwriting shape data is represented by the Euclidean distance (the distance in the two-dimensional Euclidean space) between the former input (xdn, ydn) and the latter input (xin, yin) after the normalization. That is, the distance (difference) between the former input and the latter input of each of the n points is represented as follows.

$$D_{S1} = \sqrt{\{(xd1-xi1)^2+(yd1-yi1)^2\}},$$

$$D_{S2} = \sqrt{\{(xd2-xi2)^2+(yd2-ui2)^2\}}$$

$$\ldots,$$

$$D_{sn} = \{(xdn-in)^2+(ydn-yin)^2\}$$

The differences in the shape of handwriting in all points are represented by an average of Ds1 through Dsn. The reciprocal is the above mentioned similarity 'Ss'.

Relating to the difference in the writing speed data, the speed at each point is defined as '(difference of distance from point immediately before)/(difference in time)'. That is, the speed at each of the n points of the writing speed data is represented by the following equations for the former input.

$$vd1=\sqrt{\{(xd0-xd1)^2+(d0-yd1)^2/(td0-td1)\}},$$

$$vd2=\sqrt{\{(xd1-xd2)^2+(yd1-yd2)^2\}/(td1-td2)}$$

$$\ldots,$$

$$vdn=\sqrt{\{(xdn-1-xdn)^2+(ydn-1-ydn)^2\}/(tdn-1-tdn)}$$

The same equations can be applied to the second input 'vin'. Thus, the difference between the former input and the latter input of the n points of the writing speed data are represented by the following equations.

$$Dv1=vd1-vi1, Dv2=vd2-vi2, \ldots, Dan=vdn-vin$$

The distances in all points of the writing speed are represented by an average of Dv1 through Dvn. The reciprocal is the above mentioned simultaneously 'Sv'.

Relating to the difference in the writing acceleration data, the acceleration at each point is represented by the difference in 'speed/time' between the current point and one point immediately before the current point. That is, the acceleration at each of the N points of the writing acceleration is represented by the following equations for the former input.

$$ad1=(vd0-vd1)/(td0-td1),$$

$$ad2=(vd1-vd2)/(td1-td2).$$

$$\ldots,$$

$$adn=(vdn-1-vdn)/(tdn-1-tdn)$$

The same equations are applied to the second input 'a in'. The difference between the former input and the latter input in the n points of the writing acceleration data is represented by the following equations.

$$Da1=ad1-ai1, Da2=ad2-ai2, \ldots, Dan=adn-ain$$

The difference in the writing acceleration in all points is represented by an average of Da1 through Dan. The reciprocal is the above mentioned similarity 'Sa'.

The difference in the writing pressure data is represented by the difference in the writing pressure values between the former input and the latter input at each point. That is, the differences between the former point and the latter point in the writing pressure data at each of the n points are represented by the following equations.

$$Dp1=pd1-pi1, Dp2=pd2-pi2, \ldots, Dpn=pdn-pin$$

The difference in the writing pressure data in all points is represented by an average of Dp1 through Dpn. The reciprocal is the above mentioned similarity 'Sp'.

The above mentioned 5C2 (10) combinations (Ss1, Sv1, Sa1, Sp1), (Ss2, Sv2, Sa2, Sp2), ..., (Ss10, Sv10, Sa10, Sp10) can be computed using the similarity 'Ss, Sv, Sa, Sp'. The average is (Sse, Sve, Sae, Spe).

Assuming that the similarity of the average of each component of the signature input five times by a signature registrant A as described above is (Sse, Sve, Sae, Spe)=(10, 20, 80, 10), the handwriting of the signature registrant A has the highest similarity in writing acceleration in the five input signatures. That is, it is the most stable constantly.

Based on this, the components Ss, Sv, Sa, and Sp are assigned the respective weights 1, 2, 8, and 1. It is obvious that the values of the weights can be arbitrarily set so far as they maintain the ratio of 1:2:8:1.

Using the above mentioned weights, the total similarity S1 of the signature registrant A can be computed as follows.

$$S1 = (1 \times Ss + 2 \times Sv + 8 \times Sa + 1 \times Sp)/(1+2+8+1)$$
$$= (10+10+10+640)/12$$
$$= 700/12$$
$$= 58.3$$

The relational expression above is registered in the signature dictionary information 18 as the registered signature data for authentication of the signature registrant A as shown in FIG. 6. In this example, it is assumed that the signature registrant A is the person who places the signature '富士通太郎' ('Fujitsu Taro 'in Japanese character) or 'Fujitsu' (in English character) shown in FIG. 6.

In addition, assume that the average similarity obtained as described above for each component of the signature input five times by another signature registrant B is (Sse, Sve, Sae, Spe)=(10, 10, 10, 80). The handwriting of the signature registrant B has the highest similarity in the signature input five times. That is, it is the most stable constantly.

Based on this, the components Ss, Sv, Sa, and Sp are assigned the respective weights of 1, 1, 1, and 8. Using the weights, the total similarity S2 of the signature registrant B is computed as follows.

$$S2 = (1 \times Ss + 1 \times Sv + 1 \times Sa + 8 \times Sp)/(1+1+1+8)$$
$$= (10+10+10+640)/11$$
$$= 670/11$$
$$= 60.9$$

The relational expression is registered in the signature dictionary information 18 as the registered signature data for authentication of the signature registrant B.

Next, if the person who places the signature '富士通太郎' ('Fujitsu Taro' in Japanese character) or 'Fujitsu' (in English character) is trying to be authenticated using the signature, then the signature matching process shown in FIG. 5 is started (S401). In comparing signatures for authentication, a matching threshold is set common to all signature registrants. In this authenticating method, one of the two authenticating methods is applied.

One is a method of inputting a signature at least twice. That is, the signature registrant A first inputs the signature 27 in Japanese characters '富士通太郎' ('Fujitsu Taro') or the signature 27' in English characters 'Fujitsu' a predetermined number of times (m times) using the input device 11 connected to the input equipment 13 for comparison with the above mentioned registered signature. The signature data of the input signature 27 in Japanese characters or signature 27' in English characters is input as input signature data 29 to be compared for authentication into the signature information control unit 16 of the host equipment 14 through a predetermined communications path (S402).

The signature information control unit 16 performs a normalizing process of aligning the positions of the origins of point data of the signature data of the input signature 27 in Japanese characters or signature 27' in English characters, and examples the feature point for each stroke (S403).

Then, each point is associated with another, thereby computing an average of differences (S404). In this process, an average of the differences in n points (similarity) is computed from combination of $_mC_2$ (m=2, 3, 4, 5, . . . ) for each component in the same method as in registering the signature.

The terms used in the present embodiment are explained below. According to the present embodiment, the similarity refers to the reciprocal of a difference, and its similarity is also referred to as a difference.

The average of the differences of elements computed above is further averaged to obtain a total difference (S405). This process is to add the weight already registered together with the signature data to the similarity computed above, and compute a weighted average value by obtaining an average value.

Thus, the total similarity of the input signature data for authentication is computed. Assuming that the signature registrant A has input the signature for authentication with the same handwriting and writing style at the time of registration of the signature, the similarity of the input signature data for authentication is to be almost the same as the similarity of the input signature data for registration at the time of registration of the signature. Therefore, the total similarity S1 in based on the weighted average value and computed by adding the weight registered together with the registered signature data to the similarity of the input signature data for authentication can be computed into an approximate value to the total similarity S1 of '58.3' computed from the above mentioned combination of the signature data input five times and registered.

The total similarity S1 in of the input signature data for authentication is compared with the total similarity S1 of the input signature data for registration, and the difference is computed. Then, it is determined whether or not the difference is equal to or smaller than a predetermined threshold (S406).

If the difference is equal to or smaller than a predetermined threshold (YES in S406), then a matching result signal is output from the signature information control unit 16 to the input equipment 13 (S407). Thus, a notification such as "You are successfully authenticated." is displayed on the result display unit 19 of the input equipment 13. It is an expected result because it is the authentication for the signature registrant.

Assume that the signature registrant B is trying to be authenticated as the signature registrant A by forging the handwriting of the signature registrant A. In this case, the above mentioned similarity of (Sse, Sve, Sae, Spe)=(10, 10, 10, 80) appearing the feature specific to the signature registrant B is necessarily figured out in the process in S404.

The weight of the registration as the signature registrant A is assigned to the similarity, and the total similarity S1' in obtained using the weighted average value of the input signature data for authentication is computed. That is, the weight of the signature registrant A of (1, 2, 8, 1) is assigned to each component similarity of the signature registrant B of (Sse, Sve, Sae, Spe)=(10, 10, 10, 80) to compute a weighted average value, thereby obtaining the total similarity S1' in of the signature registrant B as follows.

$$S1' in = (10 + 20 + 80 + 80)/12$$
$$= 190/12$$
$$= 15.8$$

The value of the total similarity S1' in=15.8 of the signature registrant B is quite different from the total similarity S1=58.3 of the signature registrant A. It is determined in S406 that the difference exceeds the predetermined threshold (NO in S406), and the 'non-matching' signal is output from the signature information control unit 16 of the host equipment 14 to the input equipment 13 (S408). Thus, a notification such as 'You are not authenticated.' is displayed on the result display unit 19 of the input equipment 13.

The same process is performed when the signature registrant A tries to be authenticated as the signature registrant B by forging the signature of the registrant B. That is, the similarity of each component (Sse, Sve, Sae, Spe) of the signature registrant B is (10, 10, 10, 80) as described above, the assigned weight is (1, 1, 1, 8), and the total similarity is '60.9'.

On the other hand, although the signature registrant A forges the signature of the signature registrant B, the similarity of each component (Sse, Sve, Sae, Spe) is almost necessarily computed as (10, 20, 80, 10) from the features specific to the signature registrant A. The value (1, 1, 1, 8) registered as the weight of the signature registrant B is assigned to the similarity (10, 20, 80, 10) to obtain a weighted average value. As a result, the total similarity S2' in of the input signature data for authentication forged by the signature registrant A is computed as follows.

$$S2' in = (10 + 20 + 80 + 80)/11$$
$$= 190/11$$
$$= 17.3$$

It is quite different from the registered total similarity S2=60.9 of the signature registrant B. Also in this case, it is determined in S406 that the difference exceeds the predetermined threshold, and a 'non-matching' signal is output from the signature information control unit 16 of the host equipment 14 to the input equipment 13, and a notification such as "You are not authenticated." is displayed on the result display unit 19 of the input equipment 13.

Assuming that the computation of the total similarity is not performed using a weighted average value, but using a simple average, the simple average St1 of the signature registrant A without the weight of the signature registrant A is represented by St1=(10+20+80+10)/4=120/4=30. On the other hand, the simple average St2 of the signature registrant B without the weight of the signature registrant B is represented by St2=(10+10+10+80)/4=110/4=27.5.

As described above, using the simple average, the total similarity of the signature registrant A is not so different from the total similarity of the signature registrant B. Therefore, the total similarity obtained using the simple average can cause the signature registrants A and B to be mistakenly recognized as each other.

On the other hand, using the weighted average value based on a weight, the differences among components are clarified, and there arise large differences in total similarity. That is, although a forged signature is placed, the above mentioned computed similarity appears as the specific of a person who places the forged signature, and the value is computed independent of whether or not the signature is true. Therefore, a true signature and a forged signature are not easily confused, and the difference is checked with the weighted average value provided with the weight of the true signature registrant. As a result, it can be correctly determined whether the signature is true or false.

In the other method of the two authenticating methods, a signature for authentication is to be input only once. Additionally, the five input and registered signature data is processed as previously input data in this method, the once input signature data for authentication is used as the latter input data in computing a difference, setting a combination, obtaining an average value, and computing total similarity.

If the input signature data for authentication is input by the person to be authenticated, then it is obvious that the difference between the total similarity of the input signature data for authentication and the total similarity of the input signature data for registration is equal to or smaller than the threshold.

On the other hand, if the input signature data for authentication is forged by a wrong person, the forged signature has high similarity in shape of handwriting, but the writing speed, writing acceleration, and writing pressure are the elements, which are invisible elements, cannot be followed by the other persons. Therefore, there necessarily arises a definite difference, that is, small similarity, between the forged input signature data written by others and the input signature data for registration of the signature registrant to be authenticated. Therefore, the value of the total similarity obtained by assigning the weight of the registration of the signature registrant to an average of the low similarity is also low. As a result, it is easily predicted that the difference between the total similarity of the forged signature and the total similarity of the signature by the signature registrant to be authenticated will exceed a predetermined threshold. That is, the comparison result indicates 'non-matching', and will never be a 'matching' result.

In the authentication performed by once inputting a signature, the total similarity can be compared with the components of the shape of handwriting possibly indicating high similarity removed, and with the components of only the writing speed, writing acceleration, and writing pressure picked up for comparison. It is considered that this method further improves a defense rate.

Thus, according to the present invention, since the amount of the feature indicating the most outstanding feature of a person is the most highly evaluated when the signature information is checked, Therefore, a signature can be registered and authenticated using the data sufficiently indicating the feature of the signature registrant, thereby removing the mistaken rejection of the signature registrant to be authenticated, and removing the mistaken authentication of the forged signature of a wrong person. As a result, the authentication precision can be improved, and a reliable defensive system comprising the hand-written signature authentication system can be configured in, for example, a computer system, etc.

A signature of a person changes with the lapse of time. Although it can be determined that a signature is visually true with a number of similar points taken into account, the input similarity is converted into comparison data, and an authentication process is automatically performed based on the comparison between input data and registered data in the above mentioned authentication system by determining the similarity using a threshold on the comparison result difference data. As a result, a determination reference is very strict.

Normally, in an authentication system according to living identification information such as fingerprints, voice, handwriting, etc. which is also referred to as biometrics information, since each piece of biometrics information is subject to the fluctuation due to a secular change, each authentication system requires the function of learning the fluctuation.

When a signature is frequently input for a matching check, the secular change in the living identification information does not seriously affect the authenticating process because the authentication system updates (amends) the registered living identification information through learning for the subsequent authenticating processes each time data is input for a matching check.

However, if data is not frequently input for a matching check, the authentication system cannot effectively learn the fluctuation because of lacking opportunities for learning. That is, the registered living identification information cannot be amended depending on the current situation. Therefore, according to the living identification information indicating a too large secular change, a matching check using the registered living identification information cannot successfully output a matching result, thereby unfortunately rejecting a true signature registrant.

Figure 7A:
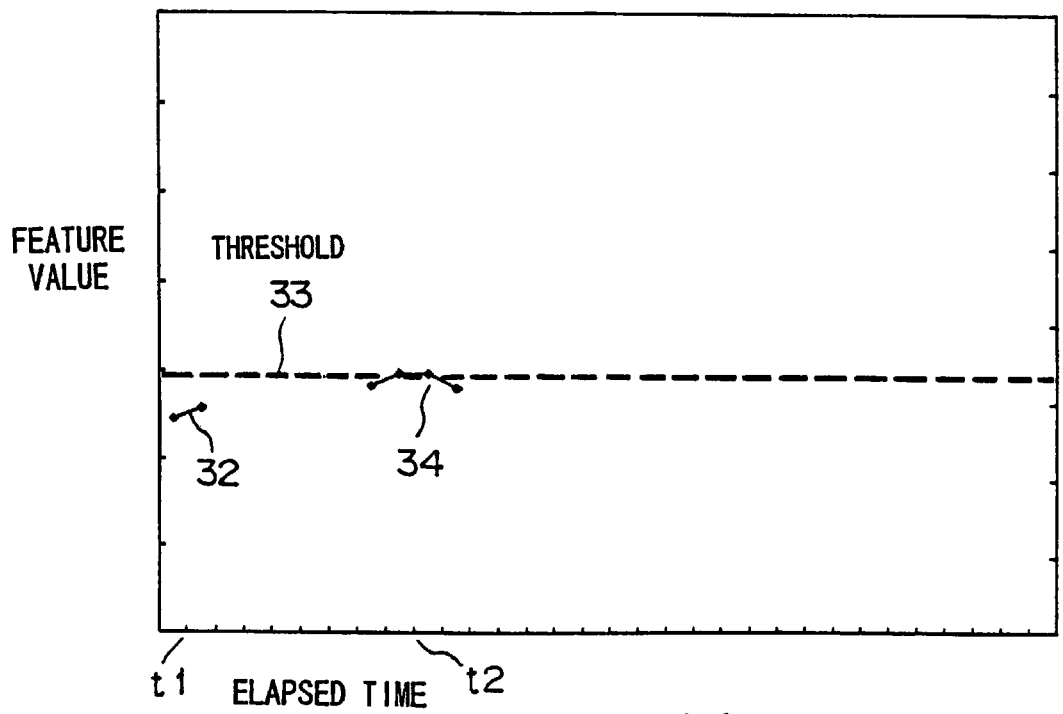
FIGS. 7A and 7B shows the relationship between the learning and the authentication with the secular change in a signature.
Figure 7B:
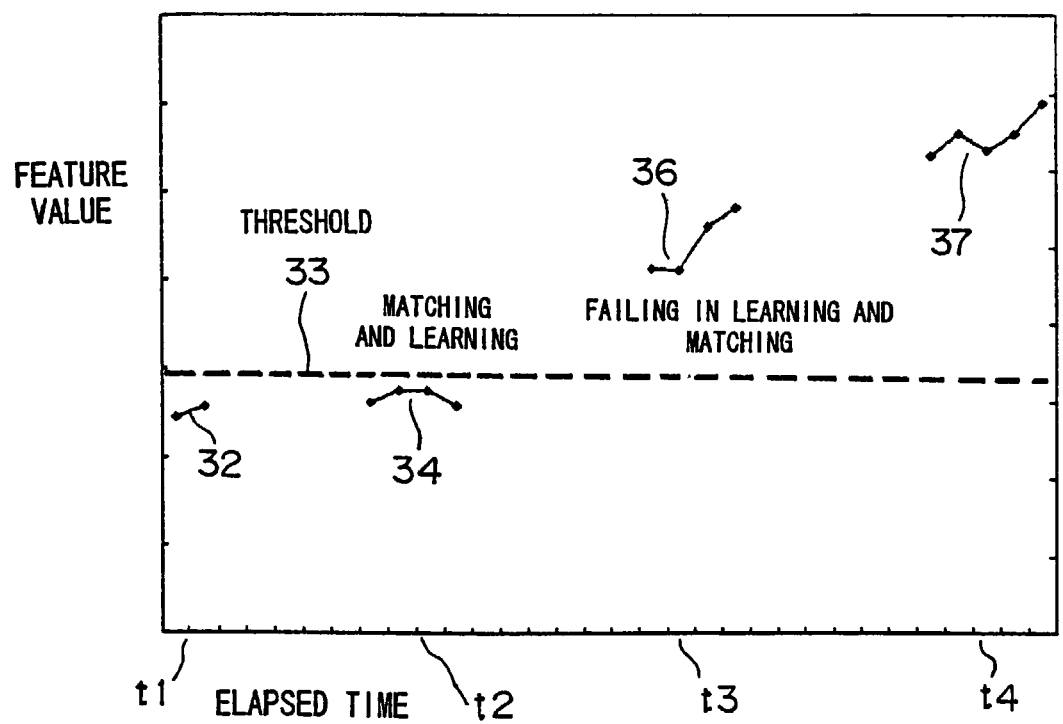

FIGS. 7A and 7B show the relationship between the learning and the authentication with a secular change in living identification information. FIGS. 7A and 7B show a horizontal axis indicating an elapsed time, and a vertical axis indicating the feature value of living identification information.

As shown in FIG. 7A, at the initial stage where the elapsed time t1 is nearly 0, a feature value 32 of input living identification information is smaller than a threshold 33, thereby outputting a matching result and successfully authenticating the input living identification information.

According to the living identification information input at an elapsed time t2, the living identification information shows a secular change, and a feature value 34 normally exceeds the threshold 33. Therefore, a non-matching result is output regarding to the input living identification information, and the information is not authenticated.

However, if the living identification information is frequently input within the elapsed time, the authentication system has learned the input living identification information, and the living identification information is recognized as showing a secular change, then the living identification information registered in the authentication system is amended according to the current living identification information for authentication.

Therefore, as shown in FIG. 7B, the feature value 34 input at an elapsed time t2 has a value equal to or smaller than the threshold 33. Therefore, the living identification information input at the elapsed time t2 receives a matching result as a learning result, and the input living identification information is authenticated.

However, as indicated by an elapsed time t3 shown in FIG. 7B, if the living identification information has not been input for authentication between the elapsed time t2 and the elapsed time t3, then the authentication system has no opportunity for learning. Therefore, no amendment is made to the registered living identification information.

If the living identification information input at the elapsed time t3 for authentication at long intervals often generates a large difference from the registered living identification information with the lapse of time. Therefore, as shown in FIG. 7B, a feature value 36 indicating the difference from the registered data far exceeds the threshold 33. Therefore, the true living identification information can receive a non-matching result, and can be rejected. This similarly holds true with a feature value 37 of the living identification information input for authentication at an elapsed time t4. Alto in this case, the true signature receives a non-matching result, and can be rejected.

Thus, if the authentication system can take a secular change in living identification information into account through learning, then the true signature can be rejected if the signature has not been input for authentication for a long time although it is the input for a matching check on the signature according to the present embodiment.

However, a signature can possibly be authenticated although it shows a secular change visually. Therefore, an automatic authentication system requires any effective solution to a signature indicating a secular change at long intervals of input of the signature.

In the hand-written signature authenticating method according to the present invention, a signature indicating a secular change because it is input at long intervals and cannot be saved by a learning system can be successfully authenticated independent of learning. This is described below as the second embodiment of the present invention.

Figure 8:
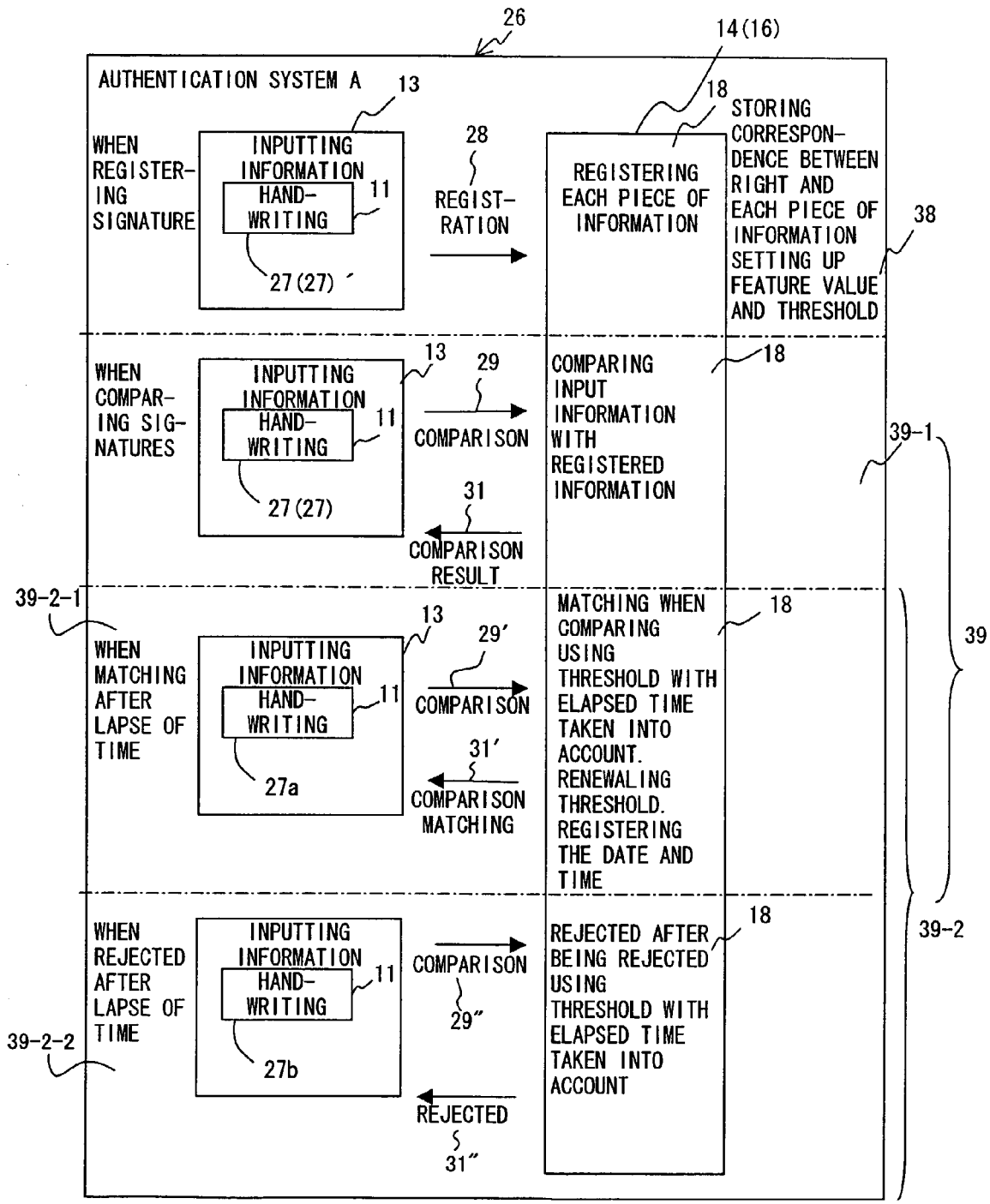
FIG. 8 is a typical view of the outline of the authenticating method in the process of applying a secular change in a signature according to the second embodiment of the present invention.

FIG. 8 is a typical view of the outline of the authenticating method in a process of saving the secular change in a signature according to the second embodiment of the present invention. In FIG. 8, the components also shown in FIGS. 2 and 6 are assigned the same reference numerals as in FIGS. 2 and 6.

As shown in FIG. 8, there is only one pattern in the registering process, that is, a registering pattern 38. However, there are two types of comparing pattern 39, that is, a first comparing pattern 39-1 and a second comparing pattern 39-2. The second comparing pattern 39-2 is further divided into processing patterns 39-2-1 and 39-2-2.

The above mentioned registering pattern 38 is the same as the pattern used at the time of registration of signature shown in FIG. 6 and described by referring to FIG. 4. In the comparing pattern 39 shown in FIG. 8, the first comparing pattern 39-1 is the same as the pattern used in comparing signatures shown in FIG. 6 and described by referring to FIG. 5, and shows the case in which a comparing process is performed using a strict threshold.

According to the present embodiment, the second comparing pattern 39-2 shown in FIG. 8 is newly provided. It shows the case in which a comparing process is performed using a threshold with the allowance of a matching condition moderated depending on the lapse of time from the previous comparing process.

In a processing pattern 39-2-1 of the second comparing pattern 39-2, a signature (handwriting) 27*a* input through the input device 11 of the input equipment 13 is input into the signature information control unit 16 of the host equipment 14 as signature data 29' for matching, a new threshold is set with an elapsed time added when the data is compared with the registered data of the signature dictionary information 18, and a matching result is output if the difference from the above mentioned total similarity is equal to or smaller than the newly set threshold. In this case, the original threshold is updated into the newly set threshold.

In a processing pattern 39-2-2 of the second comparing pattern 39-2, when an input signature (handwriting) 27*b* is compared as signature data 29" for matching with the registered data of the signature dictionary information 18 using the new threshold with the elapsed time taken into account, a non-matching result is output is the comparison result exceeds the set threshold.

Thus, some secular changes in a signature can be amended by automatically changing a threshold depending on an elapsed time, and a matching result can be output.

Therefore, in the automatic authentication system, a signature with a secular change can be saved as a signature to be authenticated. The above mentioned flow of process is further described below by referring to a flowchart.

FIG. 9 is a flowchart of the process in the above mentioned comparing pattern 39.

Figure 10:
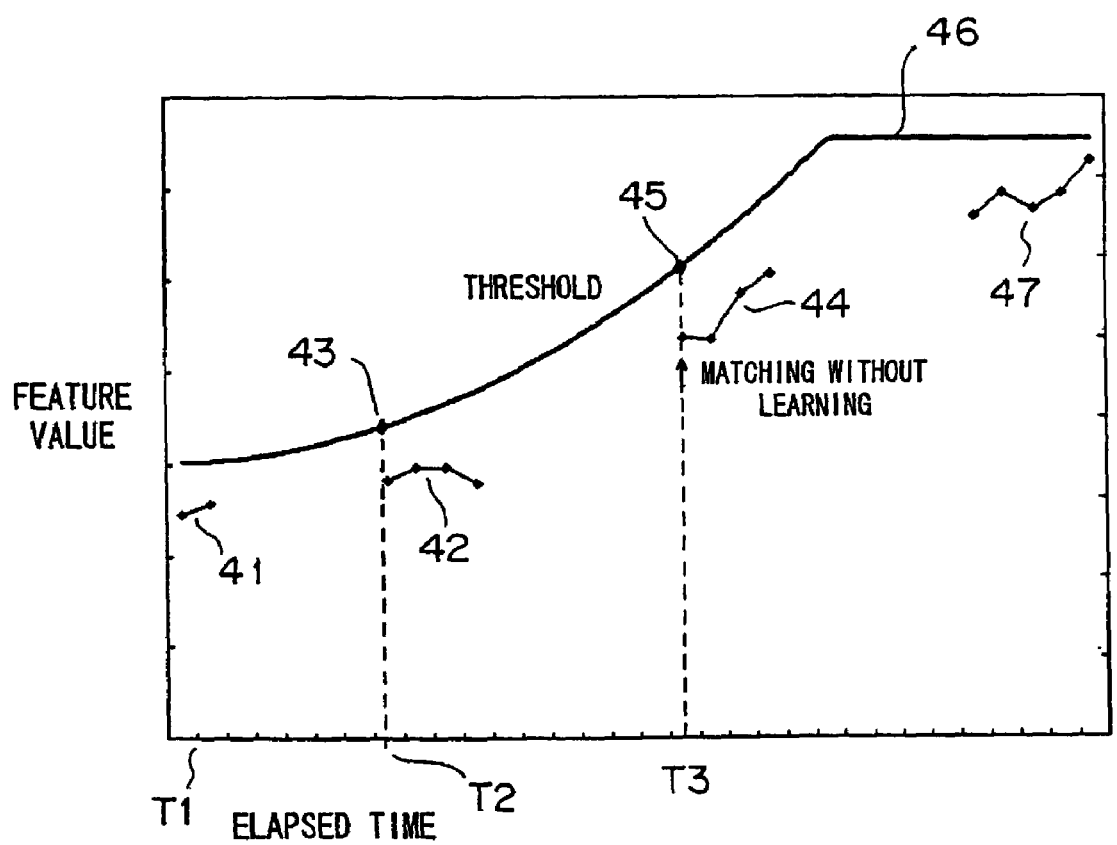
FIG. 10 shows the relationship between the secular change in a signature and a threshold for authentication in the matching process according to the second embodiment of the present invention.

FIG. 10 shows the relationship between the secular change in a signature in the process above and a threshold for matching. FIG. 10 shows a horizontal axis indicating an elapsed time, and a vertical axis indicating the feature value (difference of total similarity) of input signature data.

First, in FIG. 9, processes S901 through S904 are the same as the processes S402 through S405 described by referring to FIG. 5. In the next process S905 shown in FIG. 9, the input signature 27 (27', or 27*a*) finally input for authentication receives a matching result from the signature information control unit 16, and the date and time stored in the signature dictionary information 18 is referred to. Then, the elapsed time from the date and time to the current date and time is computed.

The input signature 27 finally input for authentication is, for example, signature data having a feature value 41 shown in FIG. 10, and the date and time referred to is the time T1 shown in FIG. 10. The input signature data from which each input point data is obtained in S901 shown in FIG. 9 is, for example, the signature data having the feature value 42 shown in FIG. 10, and the elapsed time up to the day (current date) is the elapsed time from time T1 to time T2. Depending on the elapsed time, the original threshold is amended by the new threshold computed using a predetermined increase rate.

Then, in S906 shown in FIG. 9, it is determined whether or not a feature value 42 shown in FIG. 10 of the input signature data from which the input point data is obtained in S901 is equal to or smaller than the above mentioned amended threshold (for example, a threshold 43 shown in FIG. 10). Then, as shown in FIG. 10, if the feature value 42 is equal to or smaller than the threshold 43 (Y in S906), then a matching signal is output from the signature information control unit 16 of the host equipment 14 to the input equipment 13, and the current date is stored in the signature dictionary information 18 (S907). The stored date is referred to at the time of the next matching process.

That is, for example, when the input signature data having a feature value 44 is input in S901 at the time T3 shown in FIG. 10, the time T2 at which a matching result is output is referred to, and the elapsed time from the time T2 to the current time T3 is referred to. Depending on the computed elapsed time, a new threshold 45 increasing by a predetermined value is set. That is, the threshold is amended.

Since it is determined in S906 that the feature value 44 is equal to or smaller than the threshold 45 in the case of the input signature data at time T3 shown in FIG. 10, a matching result signal is output in S907. Then, the date and time is stored.

On the other hand, if the secular change of an input signature data is too large in the elapsed period from the time T1 to the time T2 or from the time T2 to the time T3, and the feature value is large enough to exceed the threshold 43 or 45 shown in FIG. 10, then the determination in S907 is 'N', and a non-matching result signal is output.

Although the level of the secular change in a signature depends on the elapsed time, there is the possibility that a forged signature by a wrong person cannot be detected if an elapsed time is too long, the difference from a registered feature value is too large, and the threshold is correspondingly amended to output a matching result.

Therefore, according to the present embodiment, when an amended threshold, which is increased depending on the elapsed time, reaches a constant value 46, the value is set as an upper limit, and the threshold is fixed to the upper limit 46 thereafter as shown in FIG. 10 although not shown in FIG. 9.

Thus, while the feature value of input signature data is equal to or smaller than the upper limit 46 of the threshold (for example, a value 47) although it indicates a secular change, the input signature data after the secular change is authenticated. However, it is determined that input signature data having a feature value exceeding the upper limit 46 of the threshold has been forged by a wrong person.

Since the upper limit 46 of the threshold is set based on the assumption that a signature of a person does not change so much with a certain secular change taken into account, there is almost no possibility that a correct signature is mistakenly recognized as a forged signature.

Thus, according to the present invention, the allowance of a threshold is moderated for a new matching process depending on the elapsed time from the time of the previous successful matching process. Therefore, a correct user can be authenticated independent of learning although the frequency of inputting a signature for authentication is low, thereby successfully authenticating a right person regardless of the frequency of input for authentication, and improving the operability of the hand-written signature authentication system.

In registering a signature as described above, the frequency of input can be reduced down from the five times depending on the situation, thereby obtaining each of the stable (with a smaller difference, that is, higher similarity) components of input signature data. This method is described below as the third embodiment of the present invention.

Figure 11:
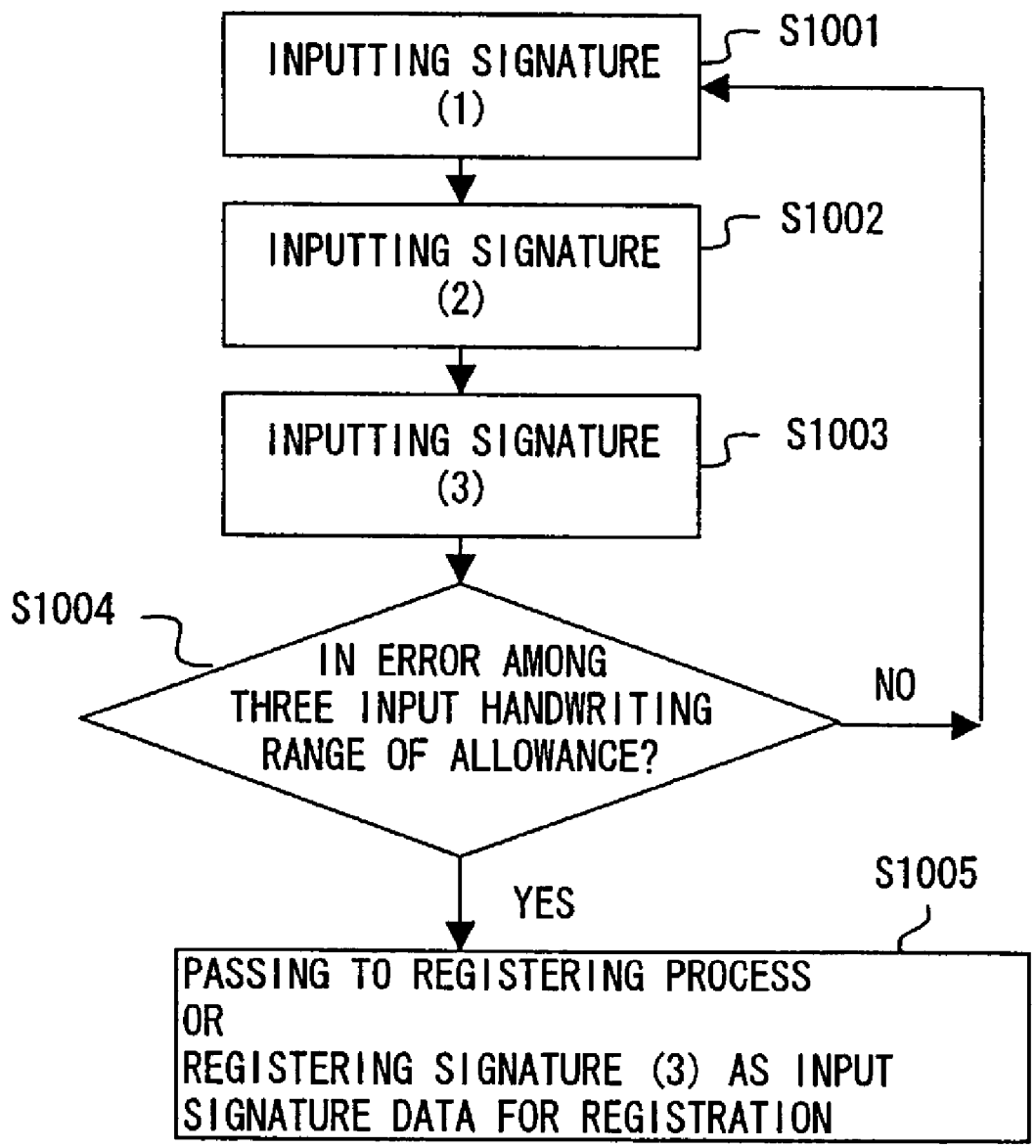
FIG. 11 shows the process procedure in the hand-written signature authenticating method according to the third embodiment of the present invention.

FIG. 11 shows the process procedure of the hand-written signature authenticating method according to the third embodiment of the present invention. Also in the present embodiment, the basic configuration of the hardware for performing the process is the same as the configuration of the hardware shown in FIG. 2.

FIGS. 12A through 12C show examples of the signatures hand-written in the input device 11 in the above mentioned process. First, in the process procedures S1001, S1002, and S1003 shown in FIG. 11, the data of the signatures 27-1, 27-2, and 27-3 or the signatures 27'-1, 27'-2, and 27'-3 input into the input device 11 three times as shown in FIGS. 12A through 12C are obtained.

In these process procedures S1001, S1002, and S1003, only signature input is described in FIG. 11, but actually the process of obtaining data at each input point described in the process procedure S302 shown in FIG. 4, the process of normalizing the obtained data described in the process procedure S303, and the process of extracting a feature point are performed.

Then, in the process procedure S1004, it is determined whether or not the matching error of the handwriting (shape of handwriting) data in the data of the signature input three times is in the range of an allowance. If the error is not in the range of an allowance (NO in S1004), then control is returned to the process procedure 1001, and the processes in the process procedures S1001 through S1004 are repeated.

If it is determined in the process procedure 1004 that the error is in the range of an allowance (YES in S1004), and the above mentioned weight is assigned to the signature data for registration in the process procedure S1005, then control is passed to the registering process shown in, for example, FIG. 4.

If no weight is assigned to the signature data for registration, then the third input signature data is registered in the signature dictionary information 18 as input signature data for registration.

When signature data for registration is weighted, the weight can also be set using an average value of similarity computed for each component by the combination of the similarity of $_mC_2$ (m=3 in this example) in the same method as in the above mentioned signature registering process from the third input signature data without entering other registering processes.

In any case, as described above, according to the present invention, input signature information is given as the signature information for registration when a person is well trained in inputting the signature in an input method which is new, unlike the method of writing a signature on normal paper, to the person at the initial stage. Therefore, the signature information for registration having a stable value can be obtained, thereby realizing a hand-written signature authentication system which is reliable in the authentication process.

If the similarity error in the handwriting of the input signature is not in the range of an allowance in the hand-written signature authenticating method according to the third embodiment of the present invention, the signature is to be input again three times. However, the signature can be input one by one while checking the similarity each time. This is explained below as a variation of the third embodiment of the present invention.

Figure 13:
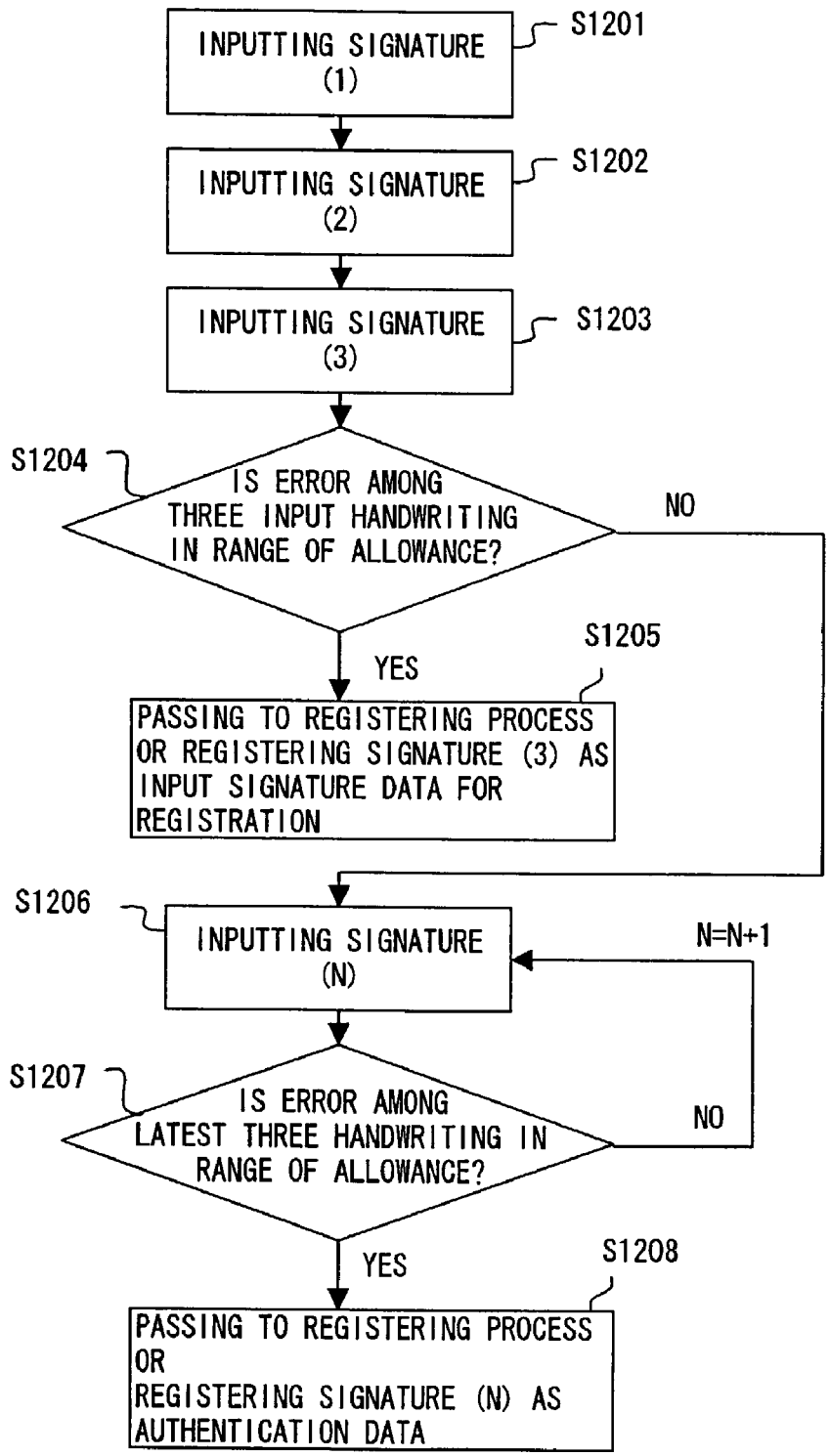
FIG. 13 shows the process procedure in the hand-written signature authenticating method in a variation of the third embodiment of the present invention.

FIG. 13 shows the process procedure in the hand-written signature authenticating method as a variation of the third embodiment of the present invention. In this embodiment, the basic configuration of the hardware for performing the process is the same as the configuration of the hardware shown in FIG. 2.

FIGS. 14A through 14E show examples of the signatures sequentially written and input into the input device 11 in the above mentioned process. First, in the process procedures S1201, S1202, and S1203, the data of the signatures 48-1 (or 48'-1), 48-2 (or 48'-2), and 48-3 (or 48'-3) input into the input device 11 three times as shown in FIGS. 14A through 14C are obtained.

In the process procedures S1201, S1202, and S1203, only the input of signature is described in FIG. 13. However, actually the process of obtaining data at each input point described in the process procedure S302 shown in FIG. 4, the process of normalizing the obtained data described in the process procedure S303, and the process of extracting a feature point are performed.

Then, in the process procedure S1204, it is determined whether or not the similarity error of handwriting (shape of handwriting) data among the signature data input three times is in the range of an allowance. If the error is in the range of an allowance (YES in S1204), then control is passed to the registering process shown in, for example, FIG. 4 in the process procedure S1205. Otherwise, the signature data input at the third time is registered as input signature data for registration in the signature dictionary information 18.

On the other hand, if it is determined in the process procedure S1204 that the handwritings of, for example, signatures 48-1 (or 48'-1), 48-2 (or 48'-2), and 48-3 (or 48'-3) shown in FIGS. 14A through 14C are not similar to each other, and the similarity error of the handwriting data of the signatures input three times is not in the range of an allowance (NO in S1204), then the data of the re-input signature 48-4 (or 48'-4) is obtained in the process procedure S1206. It is assumed that the data obtained in the process procedure S1206 is the N-th obtained data (N=4 in the first process procedure S1206).

Then, in the process procedure S1207, it is determined whether or not the similarity error of the handwriting among the signature data of the latest three signature data including the N-th input signature data, that is, the signatures 48-2 (or 48'-2), 48-3 (or 48'-3), and 48-4 (or 48'-4) shown in FIGS. 14B through 14D is in a predetermined range of an allowance.

In the examples shown in FIGS. 14B through 14D, it is determined that the handwriting of the latest signature data input three times is not similar to each other, and the similarity error of the handwriting of the three latest signatures is not in the range of an allowance (NO in S1207). In this case, control is returned to the process procedure S1206, and the data of the new (N=N+1)th input signature 48-5 (or 48'-5) is obtained.

Then, in the process procedure S1207, the process of determining whether or not the similarity error of the handwriting data of the latest three input signatures including the data of the (N=N+1)th input signature, that is, the signatures 48-3 (or 48'-3), 48-4 (or 48'-4), and 48-5 (or 48'-5) shown in FIGS. 14C through 14E is in a predetermined range of an allowance is repeated.

Thus, if the handwriting among the three input signatures 51 shown in FIG. 14 is not similar to each other, then the handwriting of the three latest input signatures is further checked. If the handwriting is not similar to each other, then checking the three latest signatures 53 including a newly input signature is repeated.

In the examples shown in FIGS. 14C through 14E, the handwriting of each signature of the three latest input signatures 48-3 (or 48'-3), 48-4 (or 48'-4), and 48-5 (or 48'-5) as the signature 53 is almost similar to each other. In this case, it is determined that the similarity error of the handwriting data of the three latest signatures is in a predetermined range of an allowance (YES in S1207). In the subsequent process procedure S1208, control is passed to the registering process shown in, for example, FIG. 4. Otherwise, the above mentioned (N=N+1)th input signature data is registered as input signature data for registration in the signature dictionary information 18.

Thus, in the example shown in FIG. 12, nine signatures in total are input if a non-matching result is output two times consecutively. However, in the variation of the embodiment, although a non-matching result is output two times consecutively, five signatures in total are input to obtain stable signature data if the data of the three latest and subsequent input signatures match each other as shown in FIG. 14, thereby reducing the signature inputting steps.

Unlike a common ball-point pen or fountain pen using on a paper, a stylus of the input device is used on a hard and slippery input plate. Therefore, the input device easily generates irregular portions in the shape of handwriting especially at the starting point or the end point. If the irregular portions in handwriting are accepted as input data as is, there is a higher possibility that a larger similarity error can occur between input signature data and registered signature data in the later signature authenticating process.

According to the present invention, the irregular portions in handwriting in the starting point, the end point, etc. are not received, that is, removed, thereby performing a more reliable authenticating process. This process is described below as the fourth embodiment of the present invention.

Described first below is the irregular portions in handwriting specific to the input device.

FIG. 15A shows an example of the handwriting of the signature '富 士 通' ('Fujitsu') in the Japanese characters or 'Fujitsu' in the English characters input into the input device 11 by a person. FIG. 15B shows an enlarged view of the portion encompassed by circles 56 or 56' of the handwriting 55' of the signature '富 士 通' ('Fujitsu') in the Japanese characters or 'Fujitsu' in the English characters.

As shown in FIG. 15B, from the handwriting 57 or 57' of the first stroke of the first character of the signature, five feature points indicated by the circles (hereinafter referred to as circles 1, 2, 3, 4, and 5) numbered by 1, 2, 3, 4, and 5 respectively are obtained. However, the feature point indicated by the circle 1 refers to an irregular portion in handwriting necessarily appearing at the starting point of a stroke on the slippery plate of the input device 11 using a stylus regardless of the handwriting (feature point) of a person.

These irregular portions in handwriting are not enlarged in the drawing, but also appear at the start (starting points) of other strokes. They appear not only at the starting points but also at the end points, the curves, etc. of the handwriting.

The data amount of the irregular portions at the starting point and the end point in handwriting is 10% or less of the data amount of a stroke in the handwriting, the angle made by the irregular portion and the subsequent portion in the handwriting is smaller than 90° in most cases. This feature can be defined as a determination reference in extracting irregular portions in handwriting.

Figure 16:
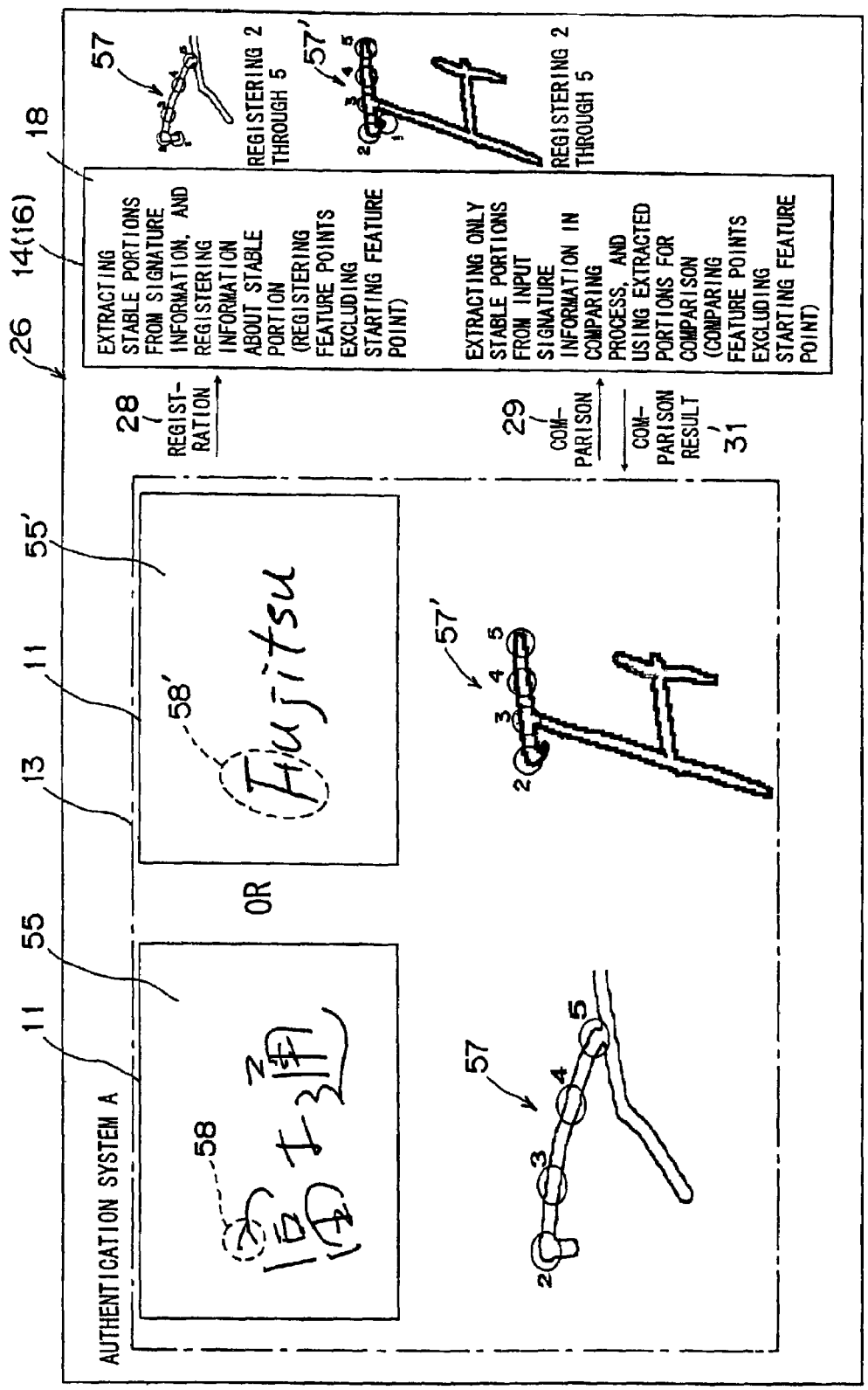
FIG. 16 is a typical view of the processing method in the signature authentication system according to the fourth embodiment of the present invention.

FIG. 16 is a typical view of the processing method for use with the signature authentication system according to the fourth embodiment of the present invention. In FIG. 16, the components also shown in FIGS. 2, 6, and 8 are assigned the same reference numerals.

When the signature registering process starts as shown in FIG. 16, a person trying to register his or her signature inputs, for example, '富士通' ('Fujitsu') which is the signature 55 in the Japanese characters or 'Fujitsu' which is the signature 55' in the English characters into the input device 11 connected to the input equipment 13 in the signature authentication system 26. Below the input device 11, FIG. 16 shows the enlarged views of the first strokes 57 and 57' of the strokes of the input signature 55 in the Japanese characters and the input signature 55' in the English characters as shown in FIG. 15.

The data of each input point of the input signatures is input as the input signature data 28 for registration into the host equipment 14, and is obtained by the signature information control unit 16. The signature information control unit 16 performs a normalizing process by aligning the position of the origin for each point data of the input signature data 28 for registration, and extracts the feature point of each stroke.

In extracting a feature point, only the feature points encompassed by the circles 2, 3, 4, and 5 of the data of the feature point of each stroke, for example, the first stroke 57 or 57' of a character are processed as the feature point data excluding the irregular portions at the starting point encompassed by the circle 1 in each stroke. The similar process is performed on each stroke, and the point data of the regular portions of the entire strokes are extracted with the feature point data appropriately selected for each stroke. The resultant data is registered as input signature data for registration in the signature dictionary information 18. Although not described in detail here, the above mentioned weighting process, etc. are also performed.

When the person who inputs the '富士通' ('Fujitsu') in the Japanese characters or 'Fujitsu' in the English characters tries to be authenticated using the signature, '富士通' ('Fujitsu') which is the signature 55 in the Japanese characters or 'Fujitsu' which is the signature 55' in the English characters is input a predetermined number m (m=1, 2, 3, . . . ) of times through the input device 11 connected to the input equipment 13.

The input signature data is input as input signature data 29 to be compared for authentication into the signature information control unit 16 of the host equipment 14 through a predetermined communications path. The signature information control unit 16 performs a normalizing process for aligning the position of the origin for each piece of point data of the input signature data, and extracts the feature point of each stroke. Also in this case, for example, the point data of the irregular portions in handwriting such as the feature point encompassed by the circle 1 of the stroke 57 or 57' of the first character is ignored.

Then the difference between the total feature value computed by the weighted average of the input signature data 29 to be compared for authentication without the point data of the irregular portions in handwriting and the total feature value computed by the weighted average of the input signature data for registration which is registered in the signature dictionary information 18 with the point data of the irregular portions in handwriting excluded, determines whether or not the computed difference is equal to or smaller than a predetermined threshold, and notifies the input equipment 13 of the determination result as a comparison result 31.

Thus, the registering and authenticating processes are performed using the point data of the essential feature points only, that is, by excluding the signature information about the irregular portions specific to the input device in handwriting at the starting point, the end point, etc. according to the present invention. Therefore, misidentification which is often detected in the authenticating process using the input device can be avoided, thereby improving the operability of the hand-written signature authentication system using the input device.

What is claimed is:

1. A computer-readable medium storing a hand-written signature authentication program used to direct a computer to perform the processes of:
    inputting a hand-written signature several times;
    computing an amount of a feature by analyzing each predetermined feature of data of the hand-written signature input several times;
    computing average similarity of the amounts of the features among the hand-written signature input several times, where the average similarity is a reciprocal of a difference between the amounts of the corresponding features;
    setting a weight for each amount of the feature from the computed average similarity and assigning the weight to each amount of the feature, thereby dynamically assigning the weight; and
    registering in a predetermined storage device each amount of the feature together with the assigned weight as hand-written signature data for registration of a person who placed the hand-written signature several times.

2. A computer-readable medium storing a hand-written signature authentication program used to direct a computer to perform:
    a storing process of maintaining in a predetermined storage device information of a pre-stored hand-written signature produced several times;
    a signature inputting process of receiving an input hand-written signature;
    a feature amount computing process of computing each amount of a feature by analyzing a predetermined feature of data of the input hand-written signature;
    a similarity computing process of computing an average of similarity between the amount of the feature of the pre-stored hand-written signature of a person who produced the pre-stored hand-written signature several times and the amount of the feature computed in said feature amount computing process, where the average of the similarity is a reciprocal of a difference between the amounts of the corresponding features;
    an input signature weighted average computing process of computing a weighted average value of the similarity, which is computed in said similarity computing process, using a weight recorded together with the amount of the feature of the pre-stored hand-written signature produced several times;
    a registered signature weighted average computing process of obtaining each average similarity for each similarity among the amounts of the features of the pre-stored hand-written signature registered in advance in the predetermined storage device, of a person who produced the pre-stored hand-written signature several times, and computing a weighted average value of each average similarity using the weight;
    a weighted average value difference computing process of computing a difference between the weighted average value computed in said input signature weighted average computing process and the weighted average value computed in said registered signature weighted average computing process; and
    an authentication/rejection determining process of outputting an authentication result when the difference computed in said weighted average value difference computing process is equal to or smaller than a predetermined threshold, and outputting a rejection result when the difference exceeds the predetermined threshold.

3. The computer-readable medium according to claim 1, wherein the amounts of the features include the amount of the feature of signature information about at least one of a shape of handwriting, writing speed, writing acceleration, and writing pressure.

4. The computer-readable medium according to claim 2, wherein said amounts of the features comprise the amount of the feature of signature information about at least one of a shape of handwriting, writing speed, writing acceleration, and writing pressure.

5. A computer-readable medium storing a hand-written signature authentication program used to direct a computer to perform the processes of: recording a predetermined amount of a feature of data of an input hand-written signature as registered data of a hand-written signature in a predetermined storage device; comparing a predetermined value computed from an amount of the feature with a predetermined value computed from the predetermined amount of the feature of the data of the hand-written signature input for matching for authentication; and determining whether or not an authentication result is to be output depending on whether a difference is equal to or smaller than a predetermined threshold or exceeds the threshold, wherein said computer performs the processes of: registering the hand-written signature data for registration input as the registered data excluding irregular portions in handwriting, where the irregular portions are 10% or less of a portion between a starting point and an end point of one stroke, and a portion forming an angle smaller than 90° made between a section and a subsequent section; and comparing the data of the hand-written signature data for matching with the data of the hand-written signature data for registration excluding the irregular portions in the hand-written signature data for matching input for the matching for authentication.

6. The computer-readable medium according to claim 5, wherein said irregular portions are unstable handwriting at a time of starting input.

7. The computer-readable medium according to claim 5, wherein said irregular portion refers to a return point at an end of input.

* * * * *